United States Patent
Schauer et al.

(10) Patent No.: US 9,600,522 B2
(45) Date of Patent: Mar. 21, 2017

(54) HARDWARE IMPLEMENTATION OF THE AGGREGATION/GROUP BY OPERATION: FILTER METHOD

(75) Inventors: Justin Schauer, San Francisco, CA (US); Philip Amberg, San Jose, CA (US); Robert David Hopkins, II, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 72 days.

(21) Appl. No.: 13/590,110

(22) Filed: Aug. 20, 2012

(65) Prior Publication Data

US 2014/0052713 A1     Feb. 20, 2014

(51) Int. Cl.
G06F 7/00       (2006.01)
G06F 17/30      (2006.01)

(52) U.S. Cl.
CPC .. *G06F 17/30412* (2013.01); *G06F 17/30324* (2013.01); *G06F 17/30501* (2013.01)

(58) Field of Classification Search
None
See application file for complete search history.

(56) References Cited

U.S. PATENT DOCUMENTS

| | | | |
|---|---|---|---|
| 5,511,190 A | 4/1996 | Sharma et al. | |
| 5,655,080 A | 8/1997 | Dias et al. | |
| 5,706,495 A | 1/1998 | Chadha et al. | |
| 5,884,299 A | 3/1999 | Ramesh et al. | |
| 6,381,601 B1 | 4/2002 | Fujiwara et al. | |
| 6,571,233 B2 | 5/2003 | Beavin et al. | |
| 6,581,055 B1 | 6/2003 | Ziauddin | |
| 6,957,225 B1 | 10/2005 | Zait et al. | |
| 6,996,569 B1* | 2/2006 | Bedell et al. | 707/737 |
| 7,111,025 B2 | 9/2006 | Finlay et al. | |
| 2001/0037345 A1* | 11/2001 | Kiernan | G06F 17/30595 |
| 2002/0032678 A1 | 3/2002 | Cornwell et al. | |
| 2002/0120620 A1 | 8/2002 | Chan et al. | |
| 2003/0187858 A1* | 10/2003 | Kirk et al. | 707/100 |
| 2005/0091256 A1* | 4/2005 | Rathakrishnan et al. | 707/102 |

(Continued)

OTHER PUBLICATIONS

W3Schools.com., "The WHERE Clause", SQL WHERE Clause, Dated 1999, 2 pages.

(Continued)

*Primary Examiner* — Thu Nga Nguyen
(74) *Attorney, Agent, or Firm* — Hickman Palmero Becker Bingham LLP

(57) ABSTRACT

Techniques are described for performing grouping and aggregation operations. In an embodiment, a request is received to aggregate data grouped by a first column. In response to receiving the request, values are loaded from the first column into an input cache. The values include values, from the first column, from a set of rows. A filter unit is programmed with logic to perform a comparison between a particular value, from the first column of a first row, and values in the first column of a plurality of rows, of the set of rows. Based on the comparison, a predicate result is generated that identifies rows, within the plurality of rows, that have a valued in the first column that matches the particular value. An aggregate value for a second column is generated by aggregating values, from the second column, of each of the rows identified by the predicate result.

19 Claims, 16 Drawing Sheets

(56) References Cited

U.S. PATENT DOCUMENTS

| | | | |
|---|---|---|---|
| 2006/0116989 | A1 | 6/2006 | Bellamkonda et al. |
| 2008/0114759 | A1 | 5/2008 | Yahia et al. |
| 2008/0183656 | A1 | 7/2008 | Perng et al. |
| 2008/0189251 | A1 | 8/2008 | Branscome |
| 2009/0055350 | A1 | 2/2009 | Branish et al. |
| 2009/0094193 | A1 | 4/2009 | King et al. |
| 2009/0193006 | A1 | 7/2009 | Herrnstadt |
| 2009/0216757 | A1 | 8/2009 | Sen et al. |
| 2009/0287628 | A1* | 11/2009 | Indeck ............... G06N 5/025 706/47 |
| 2009/0287637 | A1* | 11/2009 | Day et al. .......... 707/2 |
| 2009/0313210 | A1 | 12/2009 | Bestgen et al. |
| 2010/0030728 | A1 | 2/2010 | Chakkappen et al. |
| 2010/0082705 | A1 | 4/2010 | Ramesh et al. |
| 2010/0088315 | A1 | 4/2010 | Netz et al. |
| 2010/0161646 | A1* | 6/2010 | Ceballos et al. .............. 707/769 |
| 2010/0306219 | A1 | 12/2010 | Sthanikam et al. |
| 2012/0054225 | A1* | 3/2012 | Marwah et al. .............. 707/769 |
| 2012/0166447 | A1* | 6/2012 | Nice ................. G06F 17/30979 707/746 |
| 2012/0197868 | A1 | 8/2012 | Fauser |
| 2012/0209873 | A1 | 8/2012 | He |
| 2014/0052726 | A1 | 2/2014 | Amberg et al. |
| 2014/0052743 | A1 | 2/2014 | Schauer et al. |

OTHER PUBLICATIONS

Tang, Jianjing et al., "A Smart Optoelectronic Database filter Based on Photonic VLSI Technology", IEEE, Dated 2001, 4 pages.
Amberg, Philip, "Database Query Execution on a RAPID System Using Hardware Accelerators and an ARM Core", dated Jul. 8, 2011, 18 pages.
Afratis, Panagiotis et al., Design and Implementation of a Database Filter for Blast Acceleration, EDAA, Dated 2009, 6 pages.
Bancilhon, Francois, "Design of a Backend Processor for a Data Base Machine", ACM, dated 1980, 8 pages.
Zhou, Jingren, "Implementing Database Operations Using SIMD Instructions", ACM, dated 2002, 12 pages.
Select, A, B, C From T where A <[p1] and (B <[p2] or B> [p3]), 4 pages.
Raman, Vijayshankar, "Constant-Time Query Processing", IEEE, Dated 2008, 10 pages.
Baru K., Chaitanka, "Database Operations in a Cube-Connected Multicomputer System", IEEE, Dated 1989, 8 pages.
Govindaraju, Naga et al. "GPUTera: High Performance Graphics Co-processor Sorting for Large Database Management", ACM, 2006, 12 pages.
Kim, Changkyu, "Sort vs. Hash Revisited: Fast Join Implementation on Modern Multi-Core CPUs", ACM, dated Aug. 2009, 12 pages.
W3schools.com, "SQL Functions", dated 1999, 2 pages.
Lee, Kuo Chu, "VLSI Accelerators for Large Database Systems", IEEE, dated 1991, 13 pages.
Anonymous: "Hash Table—Wikipedia, the free encyclopedia", dated Jun. 20, 2012, Retrieved from the internet, retrieved on May 5, 2014.
Anonymous:, "Hash Table—Wikipedia, the free encyclopedia", dated Jun. 20, 2012, retrieved from the internet: http://wayback.archive.org/wiki/harshtable, 18 pages.
U.S. Appl. No. 13/590,057, filed Aug. 20, 2012, Advisory Aciton, Feb. 26, 2015.
U.S. Appl. No. 13/590,032, filed Aug. 20, 2012, Final Office Action, Jan. 26, 2015.
U.S. Appl. No. 13/590,032, filed Aug. 20, 2012, Advisory Action, Apr. 21, 2016.
U.S. Appl. No. 13/590,057, filed Aug. 20, 2012, Office Action, Jul. 1, 2014.
U.S. Appl. No. 13/590,057, filed Aug. 20, 2012, Final Office Action, Nov. 18, 2014.
U.S. Appl. No. 13/590,032, filed Aug. 20, 2016, Office Action, Jul. 8, 2016.
U.S. Appl. No. 13/590,057, filed Aug. 20, 2012, Notice of Allowance, Sep. 30, 2016.
U.S. Appl. No. 13/590,032, filed Aug. 20, 2012, Office Action, Jun. 1, 2015.
U.S. Appl. No. 13/590,032, filed Aug. 20, 2012, Office Action, Aug. 13, 2014.

* cited by examiner

HARDWARE IMPLEMENTATION OF THE AGGREGATION/GROUP BY OPERATION: FILTER METHOD

CROSS-REFERENCE TO RELATED APPLICATIONS

This application is related to U.S. patent application Ser. No. 13/590,057 entitled "Hardware Implementation of the Aggregate/Group By Operation: Hash-Table Method," filed Aug. 20, 2012. This application is also related to U.S. patent application Ser. No. 13/590,032 entitled "Hardware Implementation of the Filter/Project Operations," filed Aug. 20, 2012. The contents of all of which are incorporated herein, by reference, in their entirety for all purposes as if fully set forth herein.

FIELD OF THE INVENTION

The present disclosure relates generally to techniques for performing database operations and, more specifically, to techniques for performing filter and project operations.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A database comprises data and metadata that are stored on one or more storage devices, such as a set of hard disks. The data within a database may be logically organized according to a variety of data models, depending on the implementation. For example, relational database systems typically store data in a set of tables, where each table is organized into a set of rows and columns. In most cases, each row represents a distinct object, and each column represents a distinct attribute. However, other data models may also be used to organize the data.

In order to access and manipulate data in a database, a database management system (DBMS) is generally configured to receive and process a variety of database commands, often referred to as queries. In many implementations, the DBMS supports queries that conform to a Data Manipulation Language (DML) such as structured query language (SQL). When the DBMS receives a query, the DBMS performs one or more database operations specified by the query and may output a query result. Example database operations include filter, project, aggregation, and grouping operations, which are described in further detail below.

Filter and Project Operations

Filter and project operations are database operations that output values from certain columns of certain rows, where the rows are filtered based on some criteria, known as predicates. In SQL, the project and filter operations use the SELECT and WHERE syntax. Specifically, SELECT statements indicate what data is projected (i.e. from which columns to retrieve output values) and WHERE clauses include predicates to filter the output (i.e. indicate from which rows to retrieve output values). Examples of operators for the WHERE clause include, without limitation, the operators shown in Table 1 below.

TABLE 1

Example predicate operators

| Operator | Description |
| --- | --- |
| = | Equal |
| <> | Not Equal |
| > | Greater than |
| < | Less than |
| >= | Greater than or equal |
| <= | Less than or equal |
| BETWEEN | Between an inclusive range |
| LIKE | Search for a pattern |
| IN | Specifies a set of exact values for the column |

An example filter and project query is shown in Table 2 below.

TABLE 2

Sample filter/project query

| |
| --- |
| Query 1: |
| SELECT SALESMAN, CUSTOMER, AMOUNT |
| FROM sales |
| WHERE AMOUNT >200 and (SALESMAN = Pedro or SALESMAN = Alex) |

This query filters the data in the sales table on the criteria that the salesman must be either Pedro or Alex, and the amount of the sale must be greater than 200. For each record in the sales table that meets these criteria, the query will return the associated salesman, customer, and amount specified in the record.

For instance, Table 3 below illustrates an example sales table.

TABLE 3

Example sales table

| SALE_ID | SALESMAN | CUSTOMER | AMOUNT |
| --- | --- | --- | --- |
| 1 | Pedro | Gainsley Corp. | 400 |
| 2 | Pedro | Lexau's Lexan | 200 |
| 3 | Alex | Lexau's Lexan | 150 |
| 4 | Michael | Lexau's Lexan | 350 |
| 5 | Alex | Gainsley Corp. | 600 |
| 6 | Alex | Lexau's Lexan | 650 |
| 7 | Pedro | Gainsley Corp. | 470 |

Given the example sales table of Table 3, Table 4 below illustrates the expected output of executing Query 1.

TABLE 4

Output of example query

| SALESMAN | CUSTOMER | AMOUNT |
| --- | --- | --- |
| Pedro | Gainsley Corp. | 400 |
| Alex | Gainsley Corp. | 600 |
| Alex | Lexau's Lexan | 650 |
| Pedro | Gainsley Corp. | 470 |

Aggregation and Grouping Operations

Aggregation and grouping operations are database operations that provide summary statistics about data in specific columns. In SQL, grouping operations use the GROUP BY syntax to group results of aggregate functions by one or more columns. Table 5 below illustrates example aggregate functions that may be used in conjunction with GROUP BY statements.

TABLE 5

Example aggregate functions

| FUNCTION NAME | DESCRIPTION |
|---|---|
| AVG | Returns the average value of a column |
| COUNT | Returns the number of rows in the column |
| FIRST | Returns the first value in the column |
| LAST | Returns the last value in the column |
| MAX | Returns the largest value in the column |
| MIN | Returns the smallest value in the column |
| SUM | Returns the sum of all values in the column |

Example aggregation and grouping queries are shown below in Table 6.

TABLE 6

Example aggregation queries

| Query 2: | |
|---|---|
| SELECT | sum(AMOUNT) |
| FROM | sales |
| Query 3: | |
| SELECT | SALESMAN, sum (AMOUNT) |
| FROM | sales |
| GROUP BY | SALESMAN |
| Query 4: | |
| SELECT | SALESMAN, CUSTOMER, sum(AMOUNT) |
| FROM | sales |
| GROUP BY | SALESMAN, CUSTOMER |

Query 2 requests the total dollar amount of sales the company has made. When Query 2 is executed, the DBMS performs aggregation but no grouping. The DBMS unconditionally sums all amounts in the sales table to return a final result. Given the example sales table of Table 3, Table 7 below illustrates the expected output of executing Query 2.

TABLE 7

Result table for Query 2
sum(AMOUNT)

| 2820 |
|---|

Query 3 requests the total dollar amount of sales grouped by the salesman who made the sale. When Query 3 is executed, the DBMS performs both grouping and aggregation. Specifically, the DBMS generates one aggregated result for each unique salesman in the sales table where the result is the total sales by the particular salesman. Given the example sales table of Table 3, Table 8 below illustrates the expected output of executing Query 3.

TABLE 8

Result table for Query 3

| SALESMAN | sum(AMOUNT) |
|---|---|
| Pedro | 1070 |
| Alex | 1400 |
| Michael | 350 |

Query 4 requests the total dollar amount of sales grouped by the salesman and the customer associated with the sale. When Query 4 is executed, the DBMS performs multi-column grouping and aggregation. In this case there will be one aggregated result for each unique salesman-customer pair, and the aggregated results are the total sales for that particular salesman-customer pair. Given the example sales table of Table 3, Table 9 below illustrates the expected output of executing Query 4.

TABLE 9

Result table for Query 4

| SALESMAN | CUSTOMER | sum(AMOUNT) |
|---|---|---|
| Pedro | Gainsley Corp. | 870 |
| Pedro | Lexau's Lexan | 200 |
| Alex | Gainsley Corp. | 600 |
| Alex | Lexau's Lexan | 800 |
| Michael | Lexau's Lexan | 350 |

BRIEF DESCRIPTION OF THE DRAWINGS

The present disclosure is illustrated by way of example, and not by way of limitation, in the figures of the accompanying drawings and in which like reference numerals refer to similar elements and in which.

DETAILED DESCRIPTION

Figure 1:
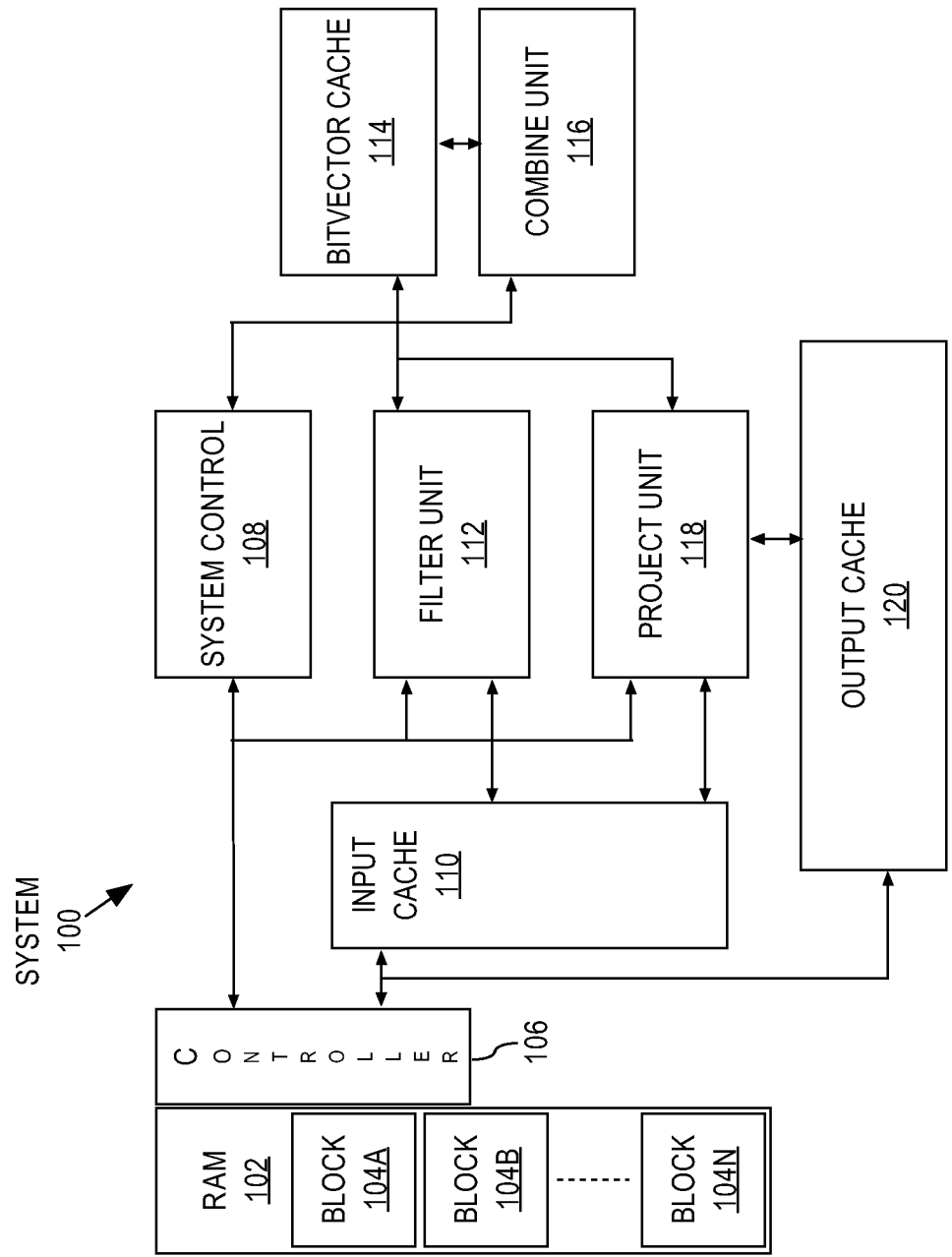
FIG. 1 is a block diagram illustrating an example system architecture for performing filter and project operations, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for performing filter, project, grouping, and aggregation operations. In an embodiment, specialized hardware may be configured to perform these database operations. The specialized hardware may accelerate query processing by reducing the amount of data flowing to rate-limited parts of a computer system, which may help alleviate data bottlenecks. In particular, the specialized hardware may reduce the amount of data that needs to be stored in RAM during filter and project operations, thereby reducing the RAM input/output (I/O) operations needed to evaluate the query. In addition, the specialized hardware reduces instruction overhead that is present in most common general purpose processors for the execution of database operations.

Furthermore the specialized hardware may allow multiple data passes through a filter unit, which allows for flexibility in evaluating complex query predicates. Further still, the specialized hardware may allow for nonlinear evaluation and processing of predicates, such that the filter unit does not need to keep pace with a constant input stream of data.

According to other techniques described herein, the grouping and aggregation may be performed without a global sort of table data. Avoiding a global sort alleviates random memory access issues that occur while sorting a large list. For example, while sorting a list, one item may go in a group located in one block of memory, while the next item might belong to a group located in another block of memory. Writing the sorted table in this case would typically require closing and opening new memory pages.

In addition, techniques are described that allow groupings and aggregations to be performed on small chunks of memory, which allows random accesses to occur in fast, low power caches.

According to embodiments described herein, data structures such as bitvectors are generated to indicate which rows satisfy one or more predicates. In an example embodiment, a bitvector is generated for each predicate in a query to indicate which rows within the database satisfy the corresponding predicate. After a bitvector has been generated for each predicate, bitwise operators are used to combine the bitvectors to generate a final bitvector. The final bitvector indicates which rows satisfy all of the predicates in the set of predicates, and may be used in projection operations to select rows to output as results to the query.

In other embodiments, data structures such as bitvectors are generated to indicate which rows are part of the same group during grouping and aggregation operations. For example, a set of bitvectors may be generated where each bitvector in the group corresponds to a distinct group. The position of the bit within each of the bitvectors corresponds to a particular row. The bit value of each bit in the bitvector is set to a first bit value if the row corresponding to the bit is part of the group represented by the bitvector or a second bit value if the corresponding row is not part of the group. Thus, the bitvectors may be used to easily identify rows that belong to the same group and may be used during performance of operations that aggregate values from columns of these rows.

Example Architecture for Processing Filter and Project Operations

FIG. 1 illustrates an example system architecture which may be configured to perform filter and project database operations, according to an embodiment. System 100 generally includes RAM 102, memory controller 106, system control 108, input cache 110, filter unit 112, bitvector cache 114, combine unit 116, project unit 118, and output cache 120.

RAM 102 stores N blocks of data, as illustrated by blocks 104A to 104N, where N may be any positive integer. RAM 102 may be implemented using any suitable computer data storage that allows random access to the stored data. Examples of RAM 102 may include without limitation dynamic RAM (DRAM) and static RAM (SRAM).

Memory controller 106 is a memory controller which manages the flow of data going to and from RAM 102. For example memory controller 106 may process requests to read and write data to RAM 102. Memory controller 106 may be implemented using any suitable memory controller, including without limitation a double data rate DDR memory controller, a dual-channel memory controller, or a fully buffered memory controller.

Input cache 110, bitvector cache 114, and output cache 120 are memory caches that store data during query processing according to techniques described further below. By caching the data, the number of I/O operations processed by RAM 102 may be minimized, thereby reducing data bottlenecks.

System control 108, filter unit 112, combine unit 116 and project unit 118 (hereby referred to as "database units") function according to the techniques described in further detail below to perform filter and project operations. Each of these components and other database units described herein may be implemented as hardware or a combination of hardware and software. For example, one or more of these units may be implemented using a programmable logic device (PLD), such as a field programmable gate array (FPGA) or other type of gate array or reconfigurable circuit. As another example, one or more of these units may be implemented using a general purpose processor, such as an advanced RISC Machine (ARM) or other reduced instruction set computer (RISC) processor.

Filtering Data Based on Predicates

Figure 2:
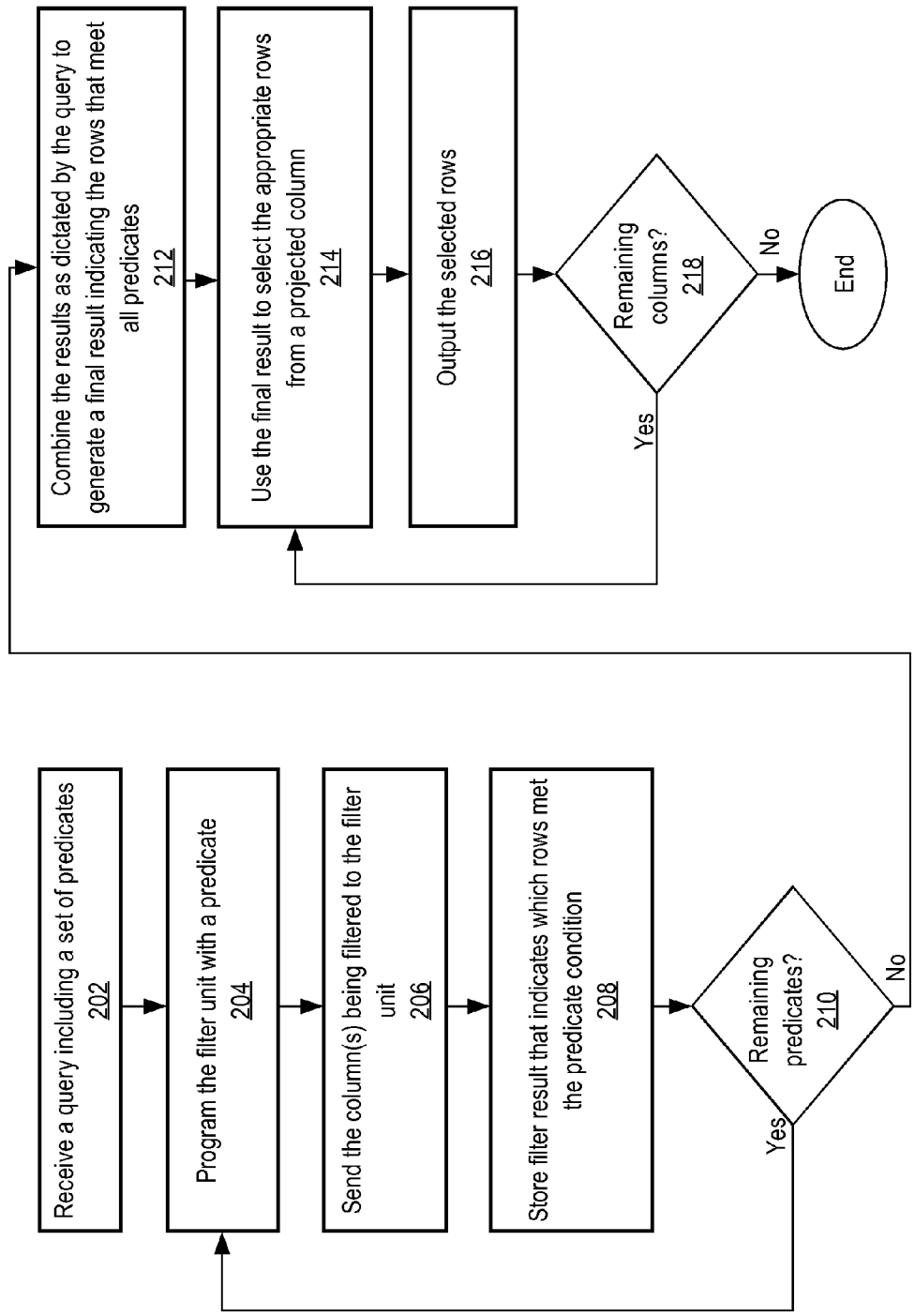
FIG. 2 is a flowchart illustrating an example process for performing filter and project operations, according to an embodiment.

FIG. 2 illustrates an example process for performing filter and project operations, according to an embodiment. The process illustrated in FIG. 2 may be implemented on any suitable system such as system 100 illustrated in FIG. 1 or system 400 illustrated in FIG. 4.

Referring to FIG. 2, in step 202, a query that includes a set of one or more predicates is received by system control 108. For example, the query may include a SELECT statement with a WHERE clause that specifies one or more predicates. However, any other suitable syntax may be used depending on the particular implementation. In an embodiment, each predicate specifies a criterion that is used to filter data extracted from a database and output or otherwise returned as results to the query. The criterion may be specified using one or more operators including, without limitation, the operators illustrated in Table 1 above.

In an example embodiment, system control 108 parses the received query to determine which predicates the query includes and how the predicates should be programmed into filter unit 112. Steps 204 to 210 define a loop that is repeated for each predicate in the set of predicates. Thus, in the first iteration of step 204, filter unit 112 is programmed with a first predicate of the set of predicates. System control 108 may program the predicates into filter unit 112 in any suitable order. Techniques for selecting the order are described in further detail below. In an embodiment, programming the filter unit may comprise configuring an FPGA or other reconfigurable circuit to apply a filtering criterion dictated by the predicate. For example, filter unit 112 may be programmed using a hardware description language (HDL) to implement any of the predicate operators illustrated in Table 1 to compare one or more values with a predicate value.

Typically, predicates impose conditions of values from specific columns. A column upon which a predicate imposes a condition is referred to herein as a target column of the predicate. Thus, for the predicate (AMOUNT>200), the AMOUNT column is the target column.

In step 206, values from columns are sent to filter unit 112. In an example embodiment, system control 108 sends a request to memory controller 106 to load values from one or more columns from RAM 102 into input cache 110. System control 108 may determine which columns should be loaded into the input cache 110 based on the predicate being evaluated. For example, system control 108 may cause the loading of values only from the target column of the predicate with which the filter unit 112 is currently programmed. For example, for the predicate AMOUNT>200, system control 108 may cause values from at least a portion of the AMOUNT column to be loaded from RAM 102 into input cache 110, as illustrated in the example implementation below.

The values from the target columns are then streamed from input cache 110 to filter unit 112. Upon receipt of the column data, filter unit 112 applies the predicate that was programmed at step 204 to generate a result identifying rows that meet the predicate. To determine which rows meet the predicate, filter unit 112 may apply one or more predicate operators to compare the value of a particular row of the received column with a predicate value specified in the query predicate.

In step 208, the results of the filter are stored as a data structure indicating which rows had target column values that met the predicate condition. In an embodiment, the data structure is a bit vector as described in further detail below. In an alternative embodiment, the data structure is encoded data generated from the bit vector. Any other suitable data structure may also be generated, stored, and used to indicate which rows had target column values that met the predicate condition.

In step 210, system control 108 determines whether there are predicates remaining in the set of predicates that have not been evaluated yet by filter unit 112. If there are remaining predicates that have not been evaluated, then the process returns to step 204, and system control 108 programs filter unit 112 with one of the remaining predicates. If all the predicates within the set of predicates have been already been evaluated, then the process continues with step 212, which is described in further detail below.

Generating Bitvectors at the Filter Unit

In an embodiment, the filter unit generates a bitvector for each predicate result. Each bit of the bitvector corresponds to a row and indicates whether the corresponding row satisfies the query predicate that is associated with the bitvector. For example, the position of the bit within the bitvector may correspond to the position of the corresponding row within a table. Thus, the third bit in a bitvector may correspond to the third row of a table.

The value of each bit represents a Boolean value, where a first bit value indicates that the corresponding row satisfies the predicate condition and a second bit value indicates that the corresponding row does not satisfy the predicate condition. For example, the third bit in a bit vector is "1" if the third row of the table satisfies the predicate that is associated with the bitvector, and is "0" if the third row of the table does not satisfy the predicate that is associated with the bitvector.

Combining Results

After a results for each predicate have been generated according to steps 202 to 210, a final result is generated in step 212 by combining the results of each predicate in a manner dictated by the query. The final result is a data structure, such as a final bitvector, that identifies the set of rows that meet all the predicates in the query.

In an embodiment, the final result is a final bitvector where, each bit of the final bitvector corresponds to a particular row of the table that is targeted by the query. Just as the value of each bit in the predicate-specific bitvectors indicates whether the corresponding row satisfies the predicate associated with the bitvector, the value of each bit in the final bitvector indicates whether the corresponding row satisfies all predicates. Thus, a first bit value (e.g. "1") is used to indicate that the corresponding row satisfies all predicates in the query, and a second bit value (e.g. "0") is used to indicate that the corresponding row does not satisfy all predicates.

In an example embodiment, system control 108 programs combine unit 116 with instructions on how to combine the bitvectors. For example, combine unit 116 may be programmed to perform one or more bitwise operations based on the logical operators specified in the query to combine the result bitvectors. In the case of Query 1, for example, system control 108 would program combine unit 116 to perform a bitwise OR operation, and then a bitwise AND operation, to produce the final bitvector, as illustrated in the example implementation below.

Projecting Filtered Data

In step 214, project unit 118 uses the final result to select rows to output from a projected column. In the case where a final bitvector is used, project unit 118 processes the final bitvector bit by bit to identify the rows that satisfy all query predicates (i.e., those rows whose corresponding bit, within the final bitvector, is set to the first bit value). In step 216, project unit 118 retrieves column data for the projected column from input cache 110 and outputs the rows identified by the final result to output cache 120. Outputting a row in this context refers to storing the row that satisfies the predicate in output cache 120. Once the row is output, it may be returned, for example to a user or application program, at any time as a result to the query.

In step 218, system control 108 or project unit 118 determines whether all columns indicated by the query have been projected. For example, in the case of Query 1, the projected columns include the SALESMAN, CUSTOMER, and AMOUNT columns. If there are any projected columns remaining, then the process returns to step 214, and the final result is applied to a column in the remaining set. Applying the final result may comprise using the final bitvector as a mask or translating the final bitvector into memory addresses, as described further below. This process repeats until all columns indicated by the query have been projected.

The process of projecting rows based on the final result may vary depending on the particular implementation. In one embodiment, if not already stored in input cache 110 from the filtering process, then rows of values from a projected column are loaded into input cache 110. Project unit 118 determines, based on the final result, which of these rows of values should be stored in output cache 120. In an embodiment, project unit 110 uses a final result bitvector as a mask that controls which rows are output at step 216 from project unit 118 to output cache 120. For example, each row of a projected column may be streamed from input cache 110 to project unit 118. Project unit 118 may then apply the bitvector as a mask to stream to output cache 120 only those rows that satisfy all query predicates. Alternatively, an address generator unit may be used, as described in further detail below, to provide project unit 118 with only those rows that should be output.

Hybrid Columnar Block Processing

In an embodiment, the system stores at least a portion of the database in RAM 102 in a hybrid-columnar fashion.

Hybrid-columnar storage breaks the database into blocks, where each block has a fixed number of rows for one or more columns. For example, a first block may store the first 50 rows for one or more columns, the second block the next 50 rows, and a third block the next 30 rows. Within each block, data is stored in a column-oriented fashion. In other words, the elements within a column are stored contiguously within the block. Storing the data in hybrid-columnar fashion allows the system to easily process columns in manageable block sizes.

In an embodiment, the filtering and projection operations described above may be performed on a per-block basis. For example, if a column is spread over multiple blocks, the filtering and project operations may be applied to a first portion of the column residing in a first block to generate a first result set. The process may repeat for each subsequent block until the entire column has been processed. The result set generated at one stage does not need to wait for a subsequent stage before being returned. For instance, the result set generated for one block may be returned before or during processing of a subsequent block.

Example System Implementation of Filter/Project Operations

FIGS. 3A to 3E are a series of block diagrams illustrating different states of a system in the process of performing filter and project operations, according to an embodiment. In particular, these figures illustrate system 100 processing Query 1 shown in Table 2 above.

Figure 3A:
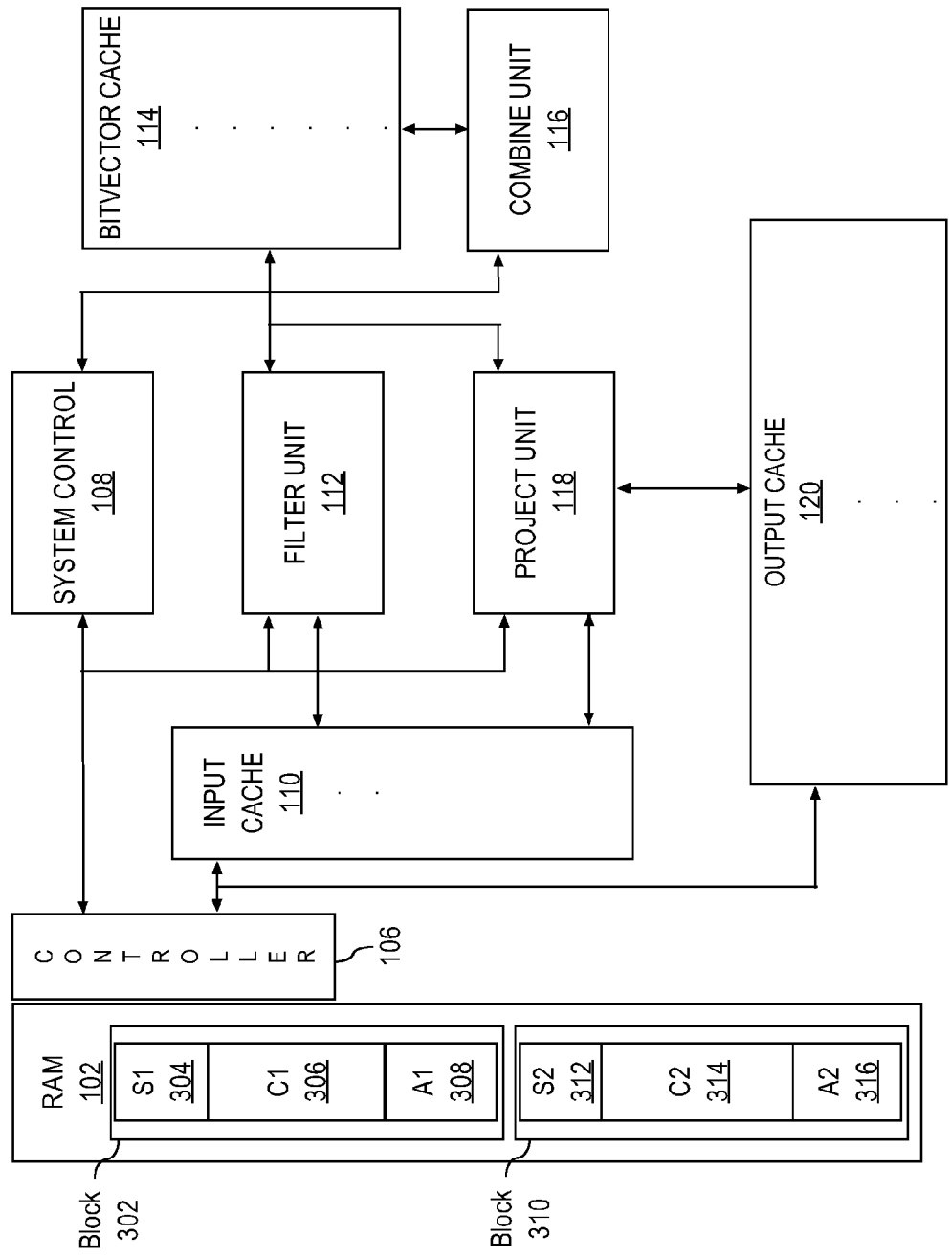
FIGS. 3A to 3E are a series of block diagrams illustrating different states of a system in the process of performing filter and project operations, according to an embodiment.

FIG. 3A is a block diagram of system 100 at the start of the filter operation. Referring to FIG. 3A, the SALESMAN, CUSTOMER, and AMOUNT columns reside in RAM 102 in a hybrid-columnar fashion and are split between block 302 and block 310. Specifically, a first portion of the SALESMAN column, CUSTOMER column, and AMOUNT column as shown by S1 304, C1 306, and, A1 308, respectively, reside in block 302. A second portion of the SALESMAN column, CUSTOMER column, and AMOUNT column, as shown by S2 312, C2 314, and A2 316, respectively, reside in block 310.

Figure 3B:
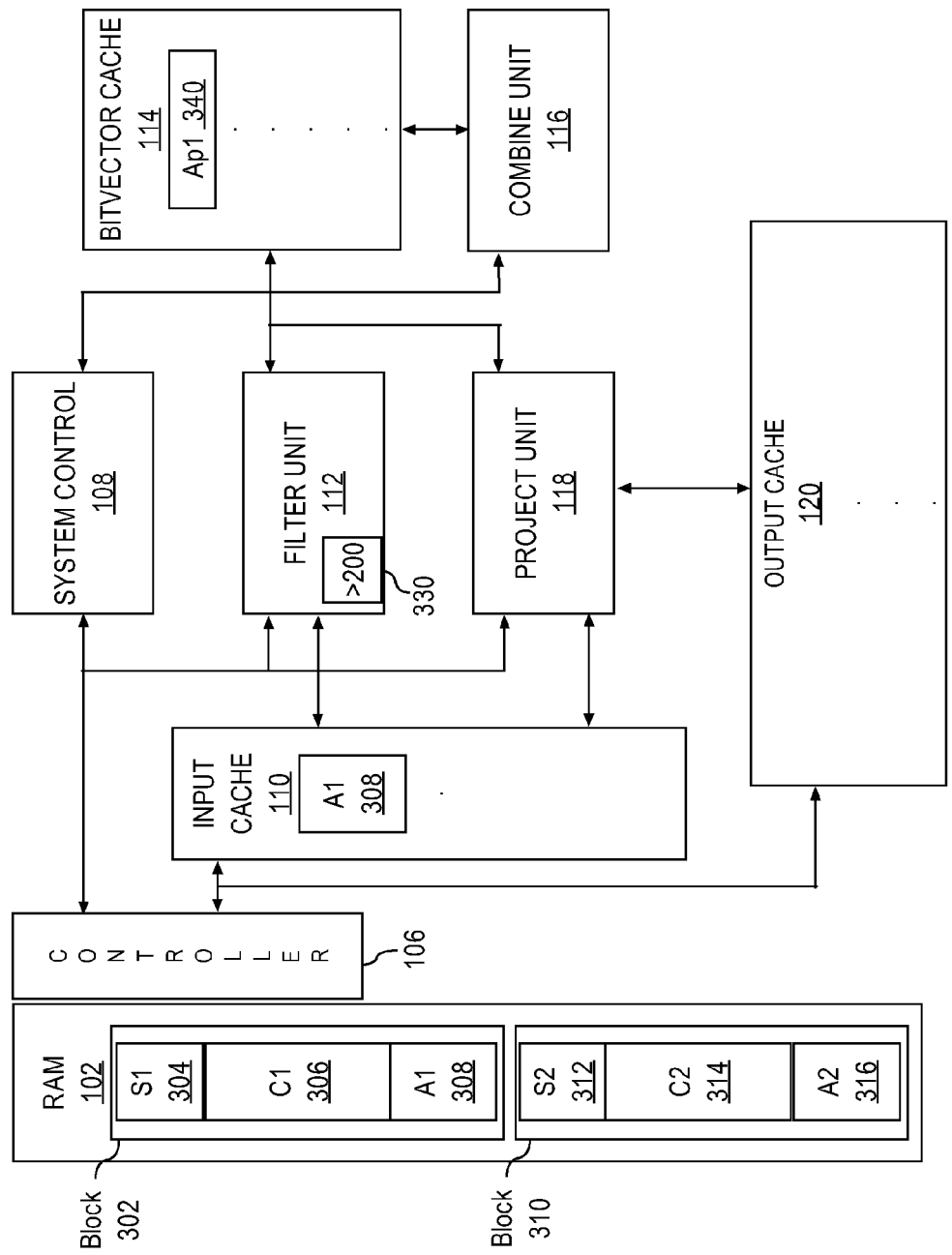

When system control 108 receives Query 1, system control 108 determines how to evaluate the predicates and causes the appropriate columns to be loaded into input cache 110. As illustrated by FIG. 3B, the AMOUNT>200 predicate is evaluated first. Accordingly, system controller 108 programs filter unit 112 with predicate 330. The first portion of the AMOUNT column, A1 308, is loaded into input cache 110 and sent to filter unit 112. Filter unit 112 then evaluates the column data of A1 308 value by value (where each value corresponds to a distinct row) using predicate 330 to generate bitvector Ap1 340, which indicates the rows of A1 308 that satisfy the AMOUNT>200 predicate. The first bitvector, Ap1 340, is shown as Ap1 in Table 10 below. Bitvector cache 114 stores this bitvector for subsequent processing.

TABLE 10

The first bitvector, Ap1, showing rows where AMOUNT >200

| AMOUNT | Ap1 |
|---|---|
| 400 | 1 |
| 200 | 0 |
| 150 | 0 |
| 350 | 1 |
| 600 | 1 |
| 650 | 1 |
| 470 | 1 |

Figure 3C:
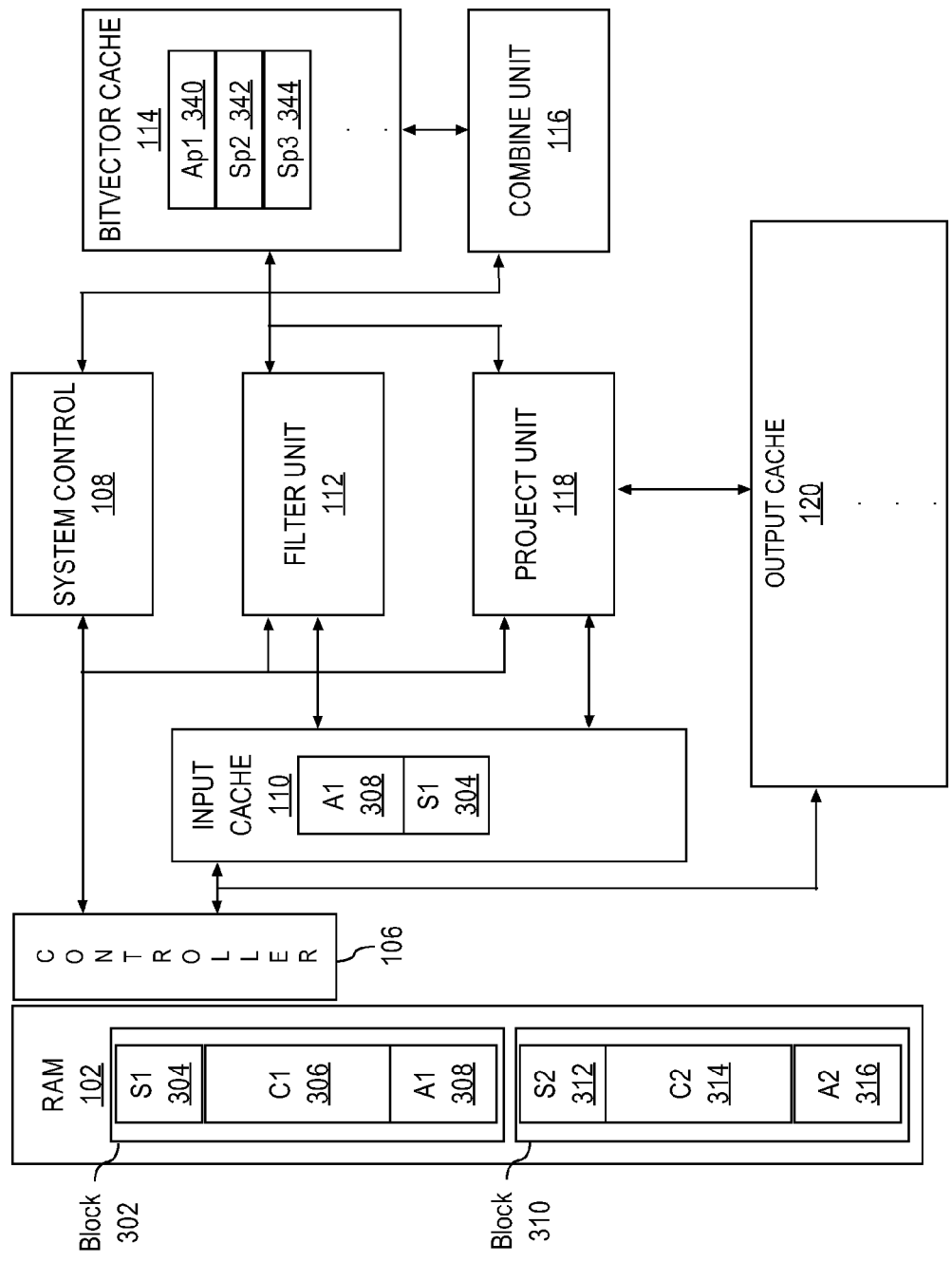

After the AMOUNT>200 predicate has been evaluated, the next two predicates, SALESMAN=Pedro, and SALESMAN=Alex, are then processed serially in a similar fashion. For example, the SALESMAN column S1 304 may be loaded into input cache 110. System control 108 programs filter unit 112 to apply the "=" operation to the "Pedro" value in the first instance and "Alex" value in the second instance. Filter unit 112 evaluates the SALESMAN column row by row in each instance to generate a second and third bitvector. FIG. 3C is a block diagram of the system after all predicates have been processed. Bitvector Sp2 342 represents the bitvector generated in response to evaluating the SALESMAN=Pedro predicate and bitvector Sp3 344 represents the bitvector generated in response to evaluating the SALESMAN=Alex predicate. These bitvectors are shown in Table 11 below.

TABLE 11

The second bitvector, Sp2, shows rows where SALESMAN = Pedro and the third bitvector, Sp3, shows rows where SALESMAN = Alex

| AMOUNT | Ap1 | SALESMAN | Sp2 | Sp3 |
|---|---|---|---|---|
| 400 | 1 | Pedro | 1 | 0 |
| 200 | 0 | Pedro | 1 | 0 |
| 150 | 0 | Alex | 0 | 1 |
| 350 | 1 | Michael | 0 | 0 |
| 600 | 1 | Alex | 0 | 1 |
| 650 | 1 | Alex | 0 | 1 |
| 470 | 1 | Pedro | 1 | 0 |

In an embodiment, the bitvector generated by filter unit 112 is as many bits long as there are rows in a block. For instance, the length of the bitvectors shown in Tables 10 and 11 above correspond to the number of values, for each column, are stored in the Block 1 302. Thus, bitvector Ap1 340 has the same number of bits as there are rows in A1 308, and bitvectors Sp2 342 and Sp3 344 have the same number of bits as there are rows in S1 304. In these tables, rows that satisfy the predicate are assigned a bit value "1" and rows that do not satisfy the predicate are assigned the bit value "0". However, these bit values may be inverted, depending on the implementation.

Figure 3D:
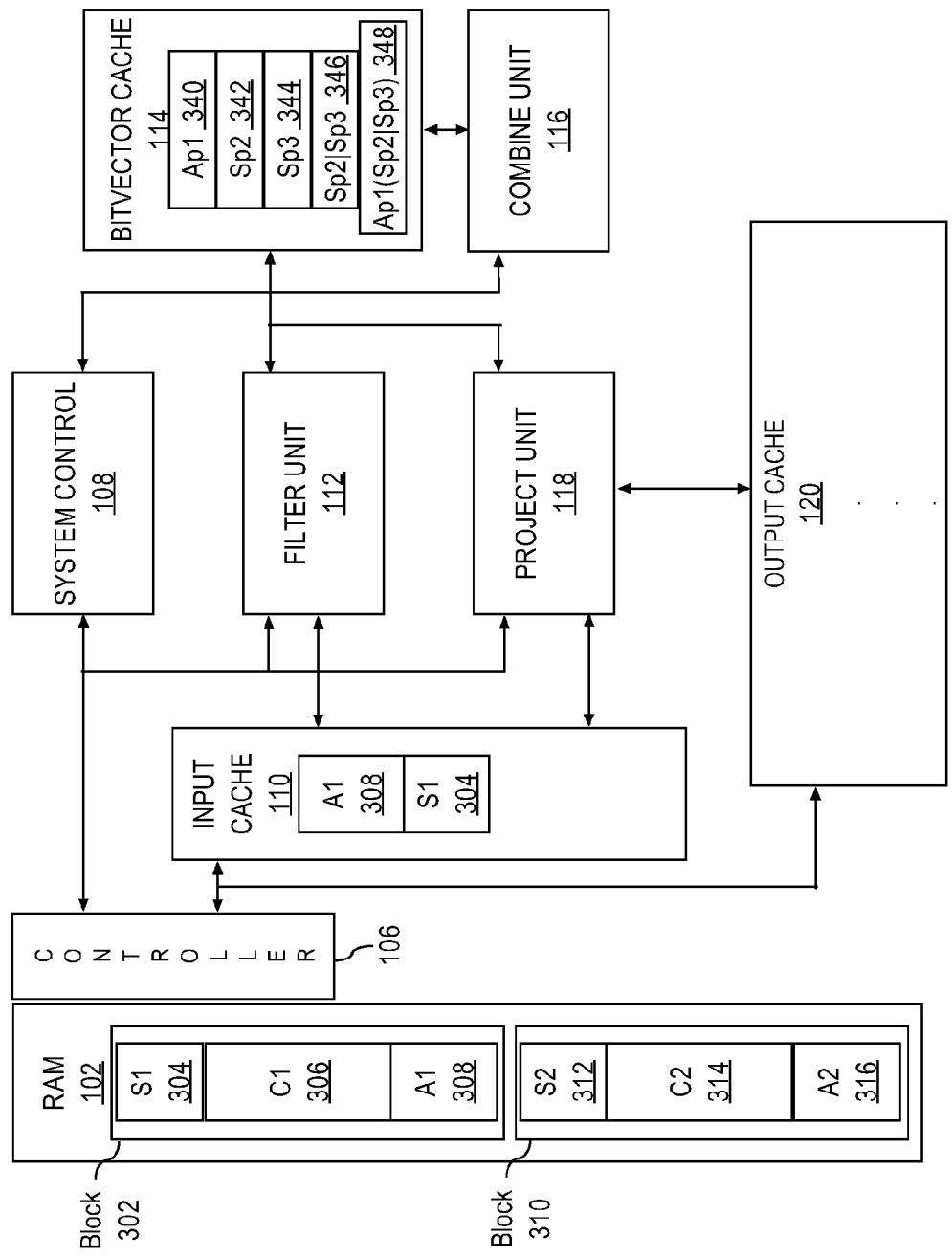

After the result bitvectors for each predicate have been generated, the final bitvector may be generated through the combine process described above. In the case of Query 1 the combine process may be implemented as dictated by the logical operators in the WHERE clause. Accordingly, system control 108 first programs combine unit 116 to perform a bitwise OR on bitvectors Sp2 342 and Sp3 344. The result of the OR operation is then used to perform a bitwise AND with bitvector Ap1 340. FIG. 3D shows a block diagram of the system after predicate result bitvectors have been combined to produce the final bitvector used to retrieve a final set of filtered rows.

Referring to FIG. 3D, bitvector cache 114 stores bitvector Sp2|Sp3 344, which is the resulting bitvector from performing the bitwise OR operation on bitvectors Sp2 342 and Sp3 344. Combine unit 116 then performs a bitwise AND operation using bitvector Sp2|Sp3 344 and bitvector Ap1 340 to generate final bitvector Ap1(Sp2|Sp3) 348. These bitvectors are shown in Table 12 below. The final bitvector shown in the last column of Table 12 represents rows, within block 1 302, that meet all the predicates of Query 1.

TABLE 12

Results of the bitvector combine operations,
including the final bitvector for block 302

| AMOUNT | Ap1 | SALESMAN | Sp2 | Sp3 | Sp2 or Sp3 | Ap1 and (Sp1 or Sp2) |
|---|---|---|---|---|---|---|
| 400 | 1 | Pedro | 1 | 0 | 1 | 1 |
| 200 | 0 | Pedro | 1 | 0 | 1 | 0 |
| 150 | 0 | Alex | 0 | 1 | 1 | 0 |
| 350 | 1 | Michael | 0 | 0 | 0 | 0 |
| 600 | 1 | Alex | 0 | 1 | 1 | 1 |
| 650 | 1 | Alex | 0 | 1 | 1 | 1 |
| 470 | 1 | Pedro | 1 | 0 | 1 | 1 |

The final bitvector is sent to project unit 118, which uses this bitvector to project rows from the appropriate columns. In Query 1, the SELECT statement indicates that data should be projected from the SALESMAN, CUSTOMER, and AMOUNT columns of the sales table. Accordingly, S1 304 may be streamed from input cache 110 to project unit 118. Project unit 118 may go through the final bitvector bit by bit and send to output cache 120 the rows of the S1 304 that correspond to "1s" in the final bitvector. Project unit 118 repeats this process for the CUSTOMER and AMOUNT columns using the same final bitvector.

Figure 3E:
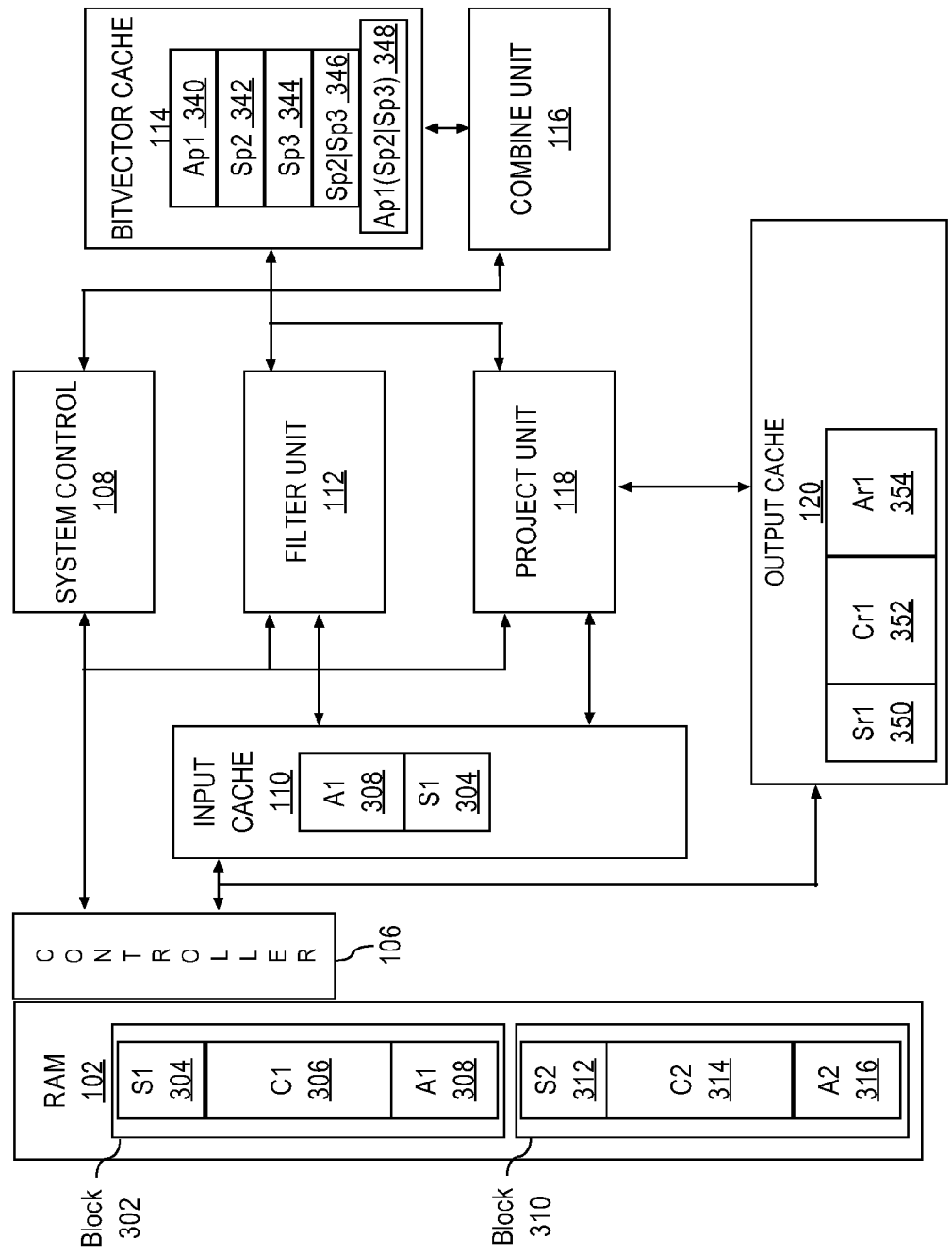

FIG. 3E is a block diagram of the system at the end of the filter and project operation. Sr1 350 represents the projected SALEMAN column data from block 302, Cr1 352 represents the projected CUSTOMER column data from block 302, and Ar1 354 represents the projected AMOUNT column data from block 302. This data may be sent out as a result while the system begins processing block 310.

The filtering and project operations described above may then be repeated on the data stored in other blocks such as block 310. For purposes of illustration, it is assumed that the sales table also includes the rows shown below in Table 13.

TABLE 13

Additional rows of example sales table

| SALE_ID | SALESMAN | CUSTOMER | AMOUNT |
|---|---|---|---|
| 8 | Pedro | Gainsley Corp. | 100 |
| 9 | Alex | Lexau's Lexan | 370 |
| 10 | Alex | Lexau's Lexan | 500 |
| 11 | Michael | Lexau's Lexan | 120 |
| 12 | Pedro | Gainsley Corp. | 280 |

Block 310 stores data for rows 8-12 in column-oriented format. For example, S2 312 may store the following values in contiguous order: Pedro, Alex, Alex, Michael, Pedro. Similarly, C2 314 stores rows 8-12 of the CUSTOMER column, and A2 316 stores rows of the AMOUNT column.

Table 14 below shows the bitvectors generated after performing the filtering operations on the data stored in block 310.

TABLE 14

Results of the bitvector combine operations,
including the final bitvector for block 310

| AMOUNT | Ap1 | SALESMAN | Sp2 | Sp3 | Sp2 or Sp3 | Ap1 and (Sp1 or Sp2) |
|---|---|---|---|---|---|---|
| 100 | 0 | Pedro | 1 | 0 | 1 | 0 |
| 370 | 1 | Alex | 0 | 1 | 1 | 1 |
| 500 | 1 | Alex | 0 | 1 | 1 | 1 |

TABLE 14-continued

Results of the bitvector combine operations,
including the final bitvector for block 310

| AMOUNT | Ap1 | SALESMAN | Sp2 | Sp3 | Sp2 or Sp3 | Ap1 and (Sp1 or Sp2) |
|---|---|---|---|---|---|---|
| 120 | 0 | Michael | 0 | 0 | 0 | 0 |
| 280 | 1 | Pedro | 1 | 0 | 1 | 1 |

The final bitvector shown in the last column of Table 14 identifies the rows within block 310 that satisfy all the query predicates. Project unit 118 parses this final bitvector bit by bit and send to output cache 120 the rows of S2 312 that correspond to "1s" in the final bitvector. Project unit 118 repeats this process for C2 314 and A2 316 using the same final bitvector.

Selective Row Filtering Based on Address Generation

In some embodiments, the rows that are supplied to filter unit 112 during predicate evaluation may be restricted based on results obtained from a previous predicate evaluation. For example, certain rows that do not satisfy a previously evaluated predicate may not need to be considered when evaluating a subsequent predicate. By selectively providing rows to filter unit 112 for processing, filter unit 112 may avoid having to evaluate the entire column for each predicate.

Figure 4:
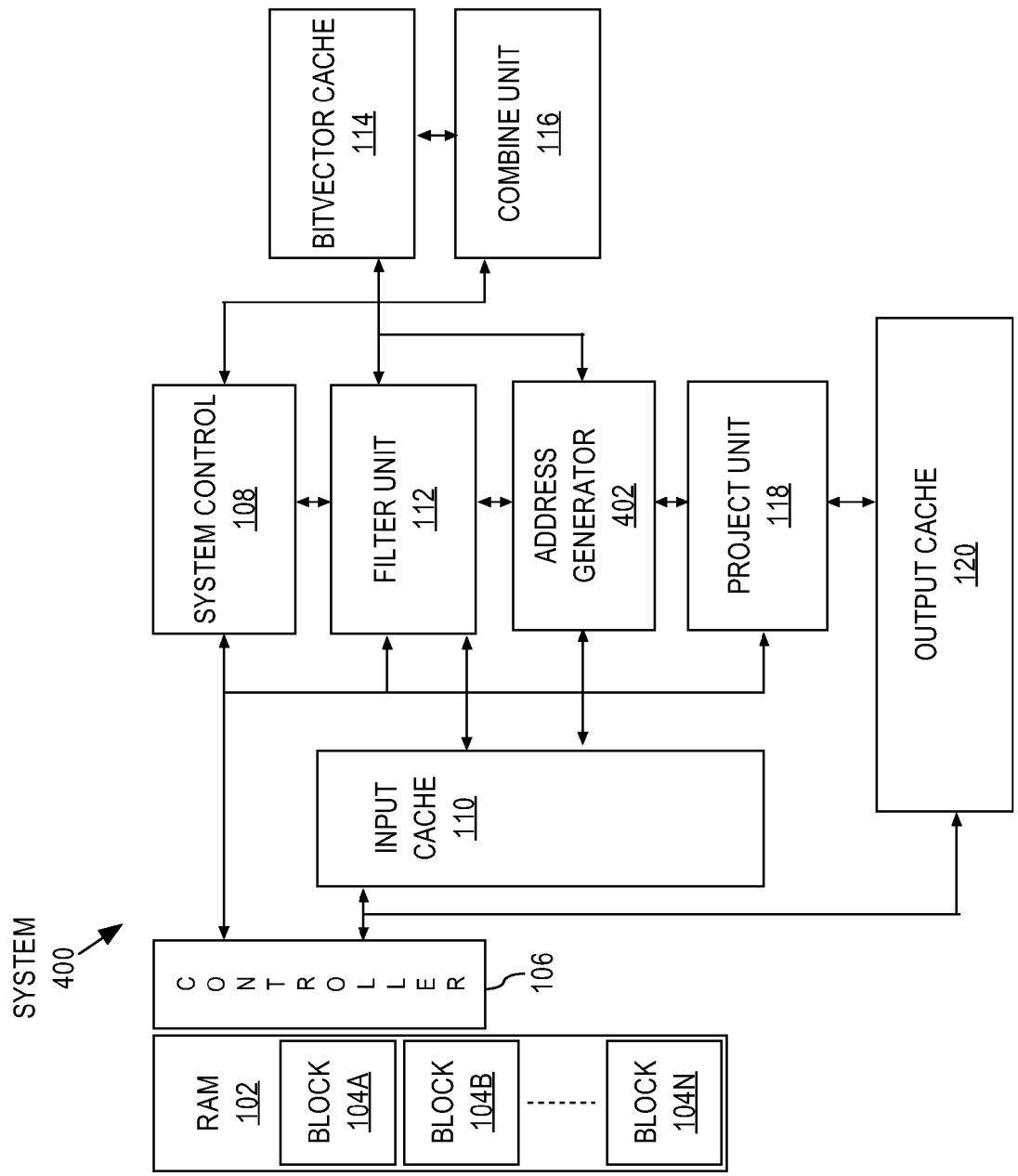
FIG. 4 is a block diagram illustrating an example system architecture with an address generator for performing filter and project operations, according to an embodiment.

FIG. 4 is a block diagram illustrating an example system architecture with an address generator for performing filter and project operations, according to an embodiment. System 400 is a variation of system 100 that includes address generator 402. System 400 may use address generator 402 for selectively supplying rows of a column being filtered to filter unit 112.

In an embodiment, address generator 402 uses the bitvector result of a previous filter to supply a subset of the rows to the filter unit for subsequent filters. The manner in which a bitvector is used to restrict the rows supplied to filter unit 112 depends on the logical operators specified in the query. For example, with Query 1, the first predicate is ANDed with the subsequent predicates. Thus, if a row does not meet the first predicate, then that row does not need to be considered for the next two predicates.

In the example implementation above, address generator 402 can use bitvector Ap1 340 to only supply the rows that met the first predicate to filter 112 unit when producing bitvectors Sp2 342 and Sp3 344. Specifically, because the bitvector associated with the predicate AMOUNT>200 is 1001111, the second and third rows need not be evaluated against the other predicates. The greater the number of subsequent evaluations that can be skipped, the more efficient the query evaluation. For example, if AMOUNT>200 had produced a bitvector 0000000, then the entire evaluation of the remaining predicates could be skipped.

Because the next two predicates are ORed together, a row that meets the second predicate does not need to be considered when evaluating the third predicate. That is, the bitvector 1100001 associated with the second predicate indicates that the first, second and seventh rows can be skipped during the evaluation of the third predicate.

In fact, during the evaluation of the third predicate, address generator 402 may use the result bitvectors of the first and second predicate to determine that only the fourth, fifth and sixth rows need to be evaluated against the third predicate. Specifically, the second and third rows can be skipped because they fail to satisfy the first predicate, and the first, second and seventh rows can be skipped because they do satisfy the second predicate.

Order of Evaluation

The order in which predicates are evaluated may vary depending on the implementation. In an embodiment, the predicates may be evaluated in a sequential order. For example, the predicates may be evaluated serially from left to right or right to left as specified in the query.

In another embodiment, the order of predicate evaluation may be based on the likelihood that the predicate will filter out a large number of rows (i.e. the "selectivity" of the predicate). When predicates that are highly selective are evaluated first, a greater number of rows are filtered out earlier in the filtering process. In system 400, this results in address generator 402 providing a smaller subset of rows to filter unit 112 during subsequent predicate evaluations. Thus, processing more selective predicates before less selective predicates may reduce processing overhead.

In an embodiment, system control 108 estimates the selectivity of a predicate based on the operators specified in the query. For example, predicates that are ANDed with other predicates are more likely to be highly selective than predicates that are ORed with other predicates. In another example, the equivalence predicate operator ("=") is more likely to be highly selective than the not equal predicate operator ("< >" or "!="). Based on the estimation, system control 108 programs the filter unit 112 in sequential order from the most selective predicate to the least selective predicate.

In other embodiments, one or more predicates specified in a query are processed in parallel. For example, filter unit 112 may be programmed with two or more predicates specified in a query. Filter unit 112 may evaluate both predicates concurrently. Techniques for parallelizing the predicate evaluation process are described further below.

Projecting Filtered Data in a System that Uses an Address Generator

In another embodiment, address generator 402 may translate the final bitvector into a set of memory addresses for each row that satisfies all query predicates. Address generator 402 may then use the memory addresses to request only these rows from input cache 110 and provide them to project unit 118 for output. This may save processing overhead because the entire column does not need to be streamed through project unit 118.

For example, at step 214, the final bitvector may be provided to address generator 402 from bitvector cache 114. Address generator 402 then determines the memory addresses for each row that has a corresponding bit value indicating that the row satisfied the set of predicates. Address generator 402 sends memory fetch requests to input cache 110 using these memory addresses. If these rows are already loaded into input cache 110, then they may be streamed directly from input cache 110 to project unit 118, which output the rows to output cache 120. Alternatively, the rows may be sent to address generator 402

Multiple Predicates Per Column

In the examples given above, filter unit 112 applied a single predicate each time column data is passed through. In alternative embodiments, filter unit 112 may be configured to process multiple predicates for each column. For example, sample Query 1 includes the predicates SALESMAN=Pedro or SALESMAN=Alex. Both of these predicates relate to the same column. Therefore, system control 108 may program filter unit with both predicates such that both predicates may be evaluated with a single pass of the SALESMAN column through filter unit 112.

Multiple Columns Per Unit

In the examples given above, filter unit 112 operated on a single column input. In alternative embodiments, filter unit 112 may include a plurality of column inputs. Multiple column inputs may be helpful when evaluating certain predicates. For example, the clause WHERE SALESMAN=CUSTOMER references both the SALESMAN and CUSTOMER columns in the same predicate. If filter unit 112 had two column inputs, then the predicate could be evaluated on a single pass. Even in cases where two columns are not included in a single predicate, having multiple columns inputs may be used to process predicates on multiple columns simultaneously.

Project unit 118 may also include a plurality of column inputs, depending on the implementation. For example, if project unit 118 had multiple column inputs, then the final bitvector may be applied concurrently to the multiple columns to project the results in parallel.

Example Architecture for Processing Grouping and Aggregation Operations

Figure 5:
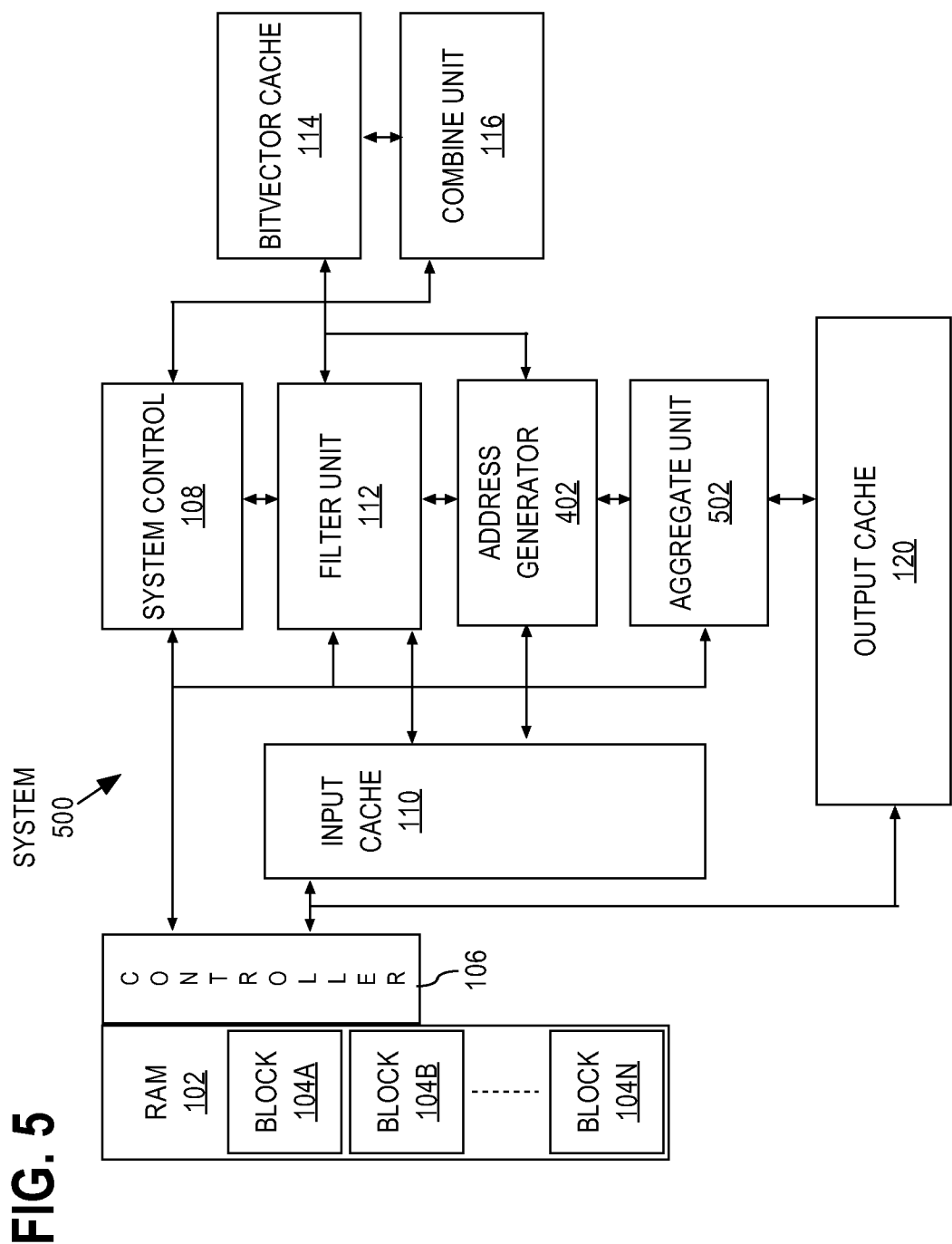
FIG. 5 is a block diagram illustrating an example system architecture for performing grouping and aggregation operations, according to an embodiment.

In an embodiment, specialized hardware may be configured to perform grouping and aggregation operations. FIG. 5 illustrates an example system architecture which may be configured to perform grouping and aggregation database operations, according to an embodiment. System 500 may include all the elements of system 100 or system 400. In addition or as an alternative to project unit 118, system 500 also includes aggregation unit 502.

System 500 may be combined or otherwise integrated with system 100 or 400 in any suitable manner. Each of the overlapping blocks may be implemented as the same hardware unit or as separate independent units. For example, filter unit 112 may be the same hardware unit that performs predicate filtering in system 100 or system 400. This same unit can also be used to create groups based on column data according to the techniques described below. Alternatively, separate filter units and/or other database units may be used to process grouping operations and filtering operations. In other embodiments, system 500 may be implemented independently of and/or separately from the filtering and projection logic illustrated in system 100 or 400.

Grouping and Aggregating Data Using a Predicate Filter

Figure 6:
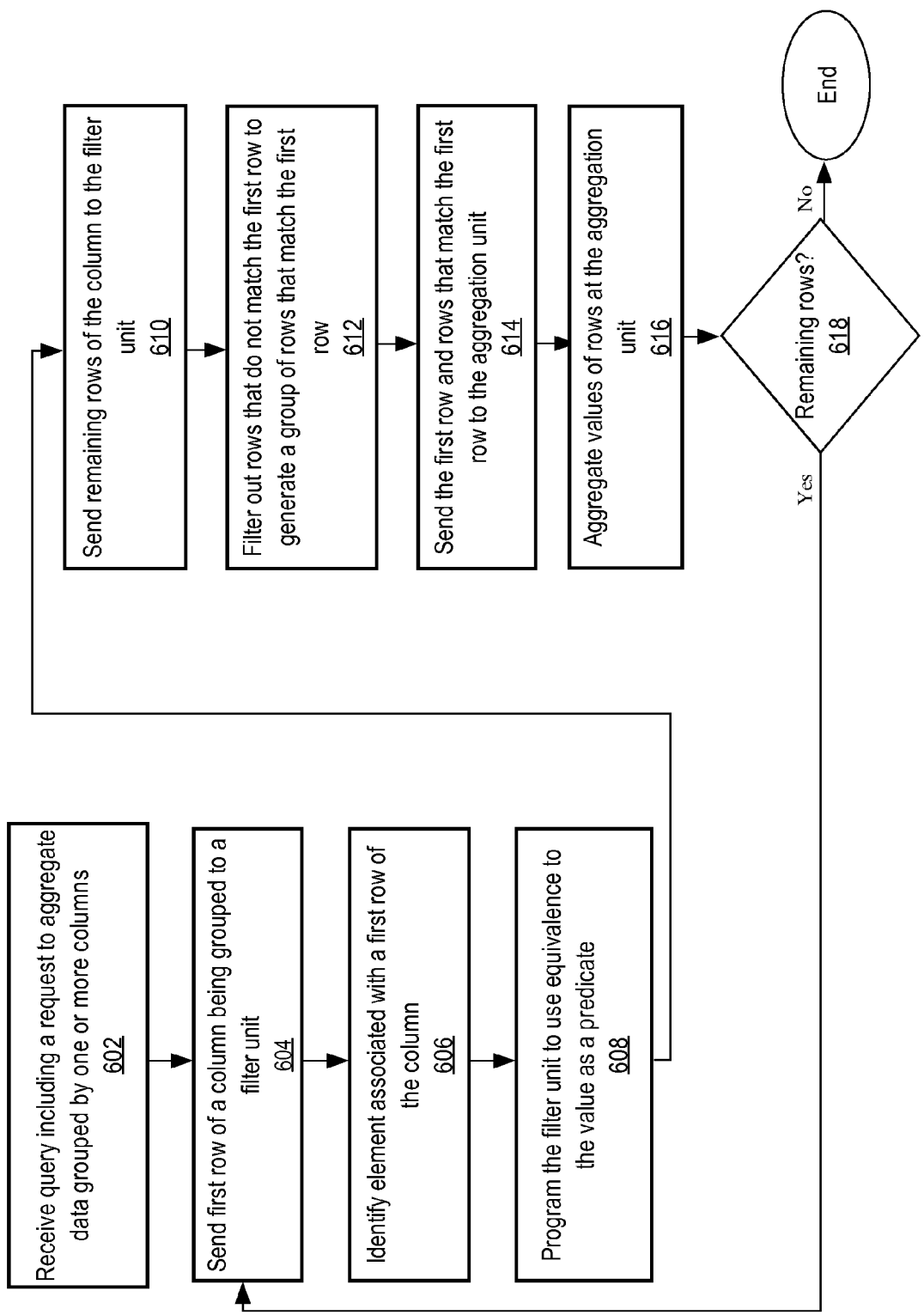
FIG. 6 is a flowchart illustrating an example process for performing grouping and aggregation operations according to an embodiment.

FIG. 6 illustrates an example process for performing grouping and aggregation operations, according to an embodiment. The process illustrated in FIG. 6 may be implemented on any suitable system, such as system 500 illustrated in FIG. 5.

Referring to FIG. 6, in step 602, a query is received that includes a request to aggregate data grouped by one or more columns. For example, the query may include any suitable aggregation function including, without limitation, those listed in Table 5. The aggregation function may be used in conjunction with a GROUP BY statement specifying one or more columns for grouping the aggregate result data. However, any suitable syntax may be used to specify the aggregation function and grouping columns.

In step 604, a row of a first column that is being grouped is sent to filter unit 112. In the case of sample Query 3, for instance, the first row of the SALESMAN column may be sent to filter unit 112. In the case of sample Query 4, the SALESMAN and CUSTOMER column may be combined and sent to filter unit 112 according to techniques described further below. Alternatively, if filter unit 112 has multiple column inputs as described in further detail below, then the first row of both the SALESMAN and CUSTOMER column may be sent to filter unit 112 concurrently.

In step 606, filter unit 112 identifies an element associated with the first row of the column. In an embodiment, the element is an item of data stored within the first row of the column. For example, referring to the example sales table shown in Table 3, the first element of the SALESMAN column is "Pedro", and the first element of the CUSTOMER column is "Gainsley Corp."

In step 608, filter unit 112 uses equivalence to the first element identified at step 606 as a predicate to filter out rows that do not belong to the group to which the first element belongs. For example, assuming the first element in the SALESMAN column is "Pedro", filter unit 112 uses the predicate "SALESMAN=Pedro" to filter out all rows that do not belong to the "SALESMAN=Pedro" group. System control 108 may program filter unit 112 with this logic in response to receiving the query at step 602.

In step 610, the remaining rows (i.e., those rows other than the first row) of the column are sent to filter unit 112. In an embodiment, the remaining rows are streamed in contiguous order from input cache 110 to filter unit 112 in the first pass. In subsequent passes, address generator may feed filter unit 112 only those rows that have not been previously grouped.

In step 612, filter unit 112 filters out rows that do not satisfy the filter to generate the group of rows to which the first row belongs (e.g. the group of all rows where SALESMAN=Pedro). This step may include generating a bitvector or other data structure that identifies each row that satisfies the equivalence predicate. Similar to the predicate filtering described above, each bit of the bitvector may correspond to a distinct row within the column, where a first bit value indicates that the row satisfies the equivalence predicate and is therefore part of the group, and a second bit value indicates that the row does not satisfy the equivalence predicate and is therefore not part of the group.

In step 614, the first row and rows that match the first row are grouped and sent to aggregation unit 502. In an example embodiment, filter unit 112 sends the bitvector generated at step 612 to address generator 402, which uses the bitvector to request from memory only those rows that are part of the current group. Once received, address generator 402 sends these rows to aggregation unit 502 for aggregation.

In step 616, aggregation unit 502 aggregates the values of the grouped rows as dictated by the query. In the case of Queries 3 and 4, for example, aggregation unit 502 would sum the values of the grouped rows stored in the AMOUNT column.

In step 618, system 500 determines whether there are any remaining rows that have not been grouped yet. If there are, then the process returns to step 604, where the grouping and aggregation operation is repeated for only those rows that have not yet been grouped. Accordingly, filter unit 112 is reprogrammed to use an element of a first ungrouped row as the equivalence predicate to form a new group.

In the present example from Table 3, rows 1 and 2 would have been grouped in the SALESMAN=Pedro group. Therefore, the third row would be the first not-yet-grouped row. The third row has the value "Alex" in the SALESMAN column, which is the grouping column of the query. Therefore, the second group is determined based on the filter SALESMAN=Alex. The second group would include rows 3, 5 and 6.

During the third iteration of step 604, row 4 is the first remaining ungrouped row. Row 4 has the value "Michael" in the SALESMAN column. Therefore, the third group is determined based on the filter SALEMAN=Michael. The third group would only include row 4. After the formation of the third group, the process illustrated in FIG. 6 would end, because there would be no ungrouped rows remaining.

During each iteration, system 500 generates and aggregates a group based on a new predicate. If all rows have been grouped, then the process ends. If the relevant columns are stored over a plurality of RAM blocks, then this process may be repeated for each of the plurality of RAM blocks, as described in further detail below, to produce a final result.

Determining Subsequent Groupings Based on Previously Generated Bitvectors

In an embodiment, the bitvectors generated at step 612 used to identify row groupings (referred to herein as "group-membership bitvectors") may also be used to selectively provide rows to filter unit 112 for subsequent groupings. Specifically, each bit in a group-membership bitvector corresponds to a particular row. When the bit is set to a first bit value such as a "1" within a group-membership bitvector, this indicates that a group for the particular row has been identified. If none of the group-membership bitvectors that have already been generated have set the bit for a particular row to the first bit value, then the particular row has not yet been associated with a group. Therefore, that particular row may be provided to filter unit 112 for subsequent processing to determine to which group the particular row belongs.

Combine unit 116 may perform bitwise operations on one or more of the group-membership bitvectors generated at step 612 to generate a bitmask identifying ungrouped rows. In one embodiment, after the first bitvector is generated, a bitwise NOT operation may be performed on the bitvector. This results in a bitmask where the first bit value identifies rows that have not been previously grouped. Accordingly, address generator 402 may operate in the same manner to translate the bitmask into memory addresses for these rows. Address generator 402 may then request retrieval of these rows, and only these rows, such that only rows that are not already assigned to groups are provided to filter unit 112 for subsequent grouping and aggregation operations.

After a second group-membership bitvector has been generated, the NOT operation alone will not work to identify previously ungrouped rows, because there are now multiple bitvectors in the set. Therefore, to generate the bitmask identifying previously ungrouped rows, combine unit 116 may perform a bitwise exclusive or (XOR) operation between the group-membership bitvector for the current group and the previously generated bitmask. This process is illustrated in the example implementation below.

Block-by-Block Grouping and Aggregation

In one embodiment, the grouping and aggregation operations described above may be performed on a block-by-block basis. For example, table data may be stored in a hybrid-columnar format in a plurality of RAM blocks. The process of FIG. 6 may be implemented on a first block to generate a first result set identifying the groups and the aggregate values within the first block. This process may repeat in the same fashion for each of the remaining RAM blocks. Accordingly, a result set identifying the groups and aggregate results is generated for each remaining block.

Depending on the particular implementation, output cache 120 may fill with data before processing on the plurality of blocks has completed. For example, output cache 120 may not have sufficient storage to store the result sets for every block if the relevant data is spread over many blocks. Storage in output cache 120 may also be consumed more quickly if there are a large number of groups or the column data elements are large.

To free up storage space in output cache 120 or to generate a final result, a plurality of result sets for different blocks may be grouped and aggregated according to the process describe in FIG. 6. For example, after the output cache fills or the amount of available storage space is otherwise less than a threshold, the data in output cache 120 may be sent to the input cache 110. A group and aggregate operation is then run on the input cache data in the same fashion as described previously. Thus, the results records of the different result sets are grouped and aggregated, which may free up more storage by consolidating the result sets. If this process does not free up space in output cache 120 or the output cache 120 reaches a state of such high occupancy that performance seriously degrades, then the output cache contents may be passed to another unit such as a general purpose processor for larger-scale aggregation.

Example System Implementation of Grouping/Aggregation Operations

FIGS. 7A to 7E are a series of block diagrams illustrating different states of a system in the process of performing grouping and aggregation operations, according to an embodiment. In particular, these figures illustrate system 500 processing the sample Query 3 shown in Table 6 above.

Figure 7A:
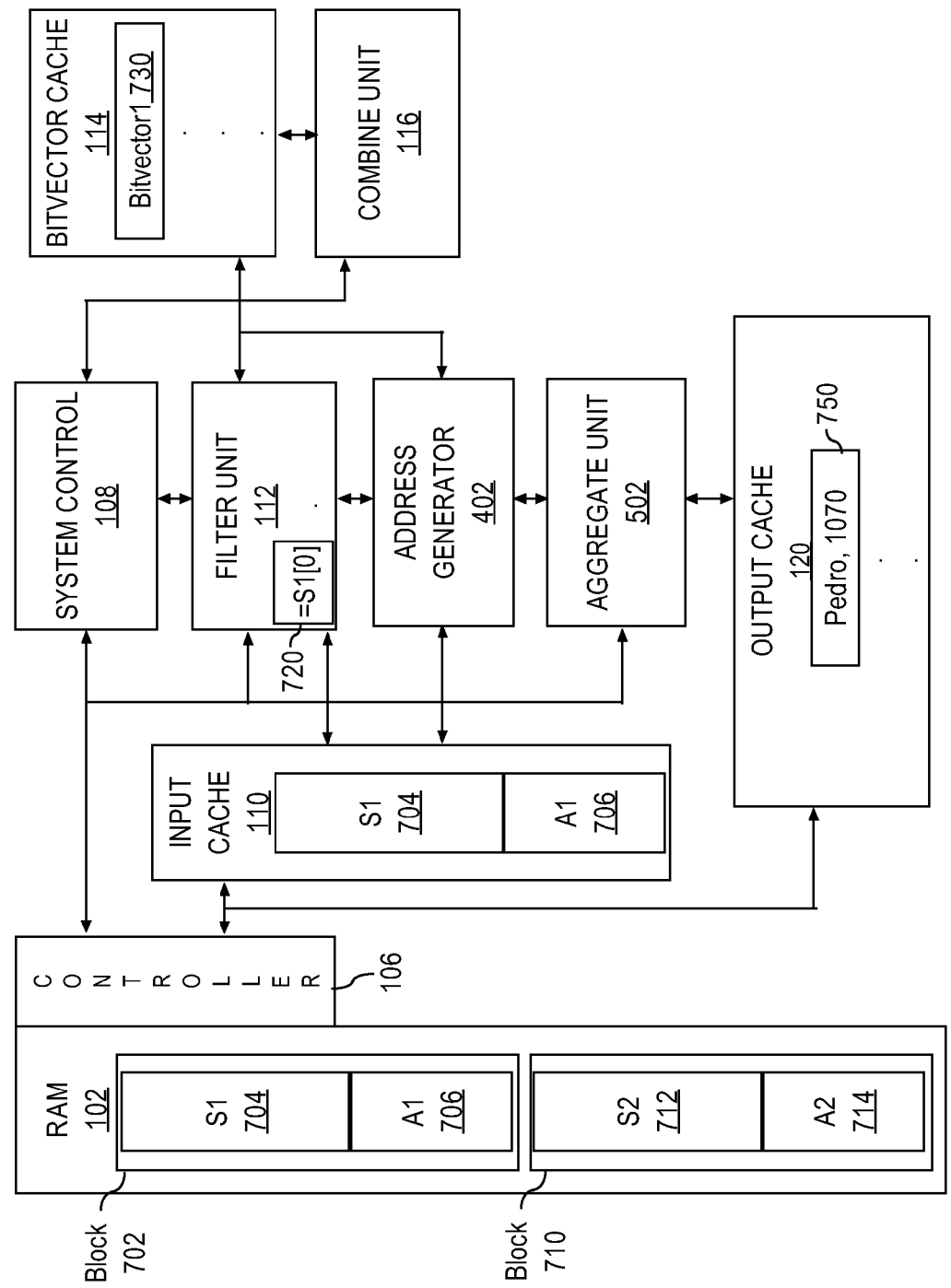
FIGS. 7A to 7E are a series of block diagrams illustrating different states of a system in the process of performing grouping and aggregation operations, according to an embodiment.

FIG. 7A shows a system diagram after processing a first group for Query 3. As illustrated, the SALESMAN and the AMOUNT column are divided between a plurality of blocks. A first portion of the SALESMAN column, S1 704, and a first portion of the AMOUNT column, A1 706, are stored in block 702, and a second portion of the SALESMAN column, S2 712, and a second portion of the AMOUNT column, A2 714, are stored in block 710. In an embodiment, the data is stored within these blocks in a hybrid-columnar format.

When Query 3 is received, system control 108 causes a first portion of the SALESMAN column, S1 704, to be loaded into input cache 110. The SALESMAN column may be streamed from input cache 110 to filter unit 112 to group rows based on the SALESMAN column. In order to compute the first group, system control 108 programs filter unit 112 to use equivalence to the first element of the SALESMAN as a filtering predicate. This is represented by predicate 720 of FIG. 7A. In the present example, the first element of the SALESMAN column is "Pedro", so the first group is the group of rows where SALESMAN=Pedro.

Filter unit 112 may operate in the same manner described above for the filtering and project operations with additional logic for determining the first element of a column for use in predicate evaluation. Once programmed with predicate 720, the remaining rows of the SALESMAN column are streamed from input cache 110 to filter unit 112 for evaluation. Given the sample sales table shown in Table 3 and the filter SALESMAN=Pedro, filter unit 112 would generate the group-membership bitvector shown in Table 15 below.

TABLE 15

| Filter unit output from predicate SALESMAN = Pedro | |
|---|---|
| SALESMAN | Bitvector1 |
| Pedro | 1 |
| Pedro | 1 |
| Alex | 0 |
| Michael | 0 |
| Alex | 0 |
| Alex | 0 |
| Pedro | 1 |

Group-membership bitvector1 corresponds to the predicate results of predicate 720. Each bit in the group-membership bitvector with a value of "1" identifies a row in the SALESMAN column with a value of "Pedro." Thus, all rows that belong to a first group are identified by the same bit value. Conversely, each bit that has a bit value of "0" identifies a row that does not have a value of "Pedro" and, therefore, does not belong to the first group.

After filter unit 112 has generated the group-membership bitvector shown in Table 15, the group-membership bitvector may then be sent to aggregation unit 502. Aggregation unit 502 operates on the rows of the AMOUNT column indicated by the bitvector as satisfying predicate 720. In one embodiment, address generator 402 translates the group-membership bitvector into memory addresses of the rows in A1 706 for which the corresponding bit value equals "1". These memory addresses are used to retrieve from RAM 102, into input cache 110, the values from A1 706 of the rows that belong to the group. These values are then provided to aggregation unit 502 for aggregation.

In addition to the group-membership bitvector, aggregation unit 502 also receives an indication of the type of aggregation operation it is to perform. For example, system control 108 may program aggregation unit 502 to perform an aggregation function specified in the query. Example aggregation functions include without limitation the aggregation functions shown in Table 5. In the case of Query 3, aggregation unit 502 sums the data stored in the rows of the AMOUNT column indicated by group-membership Bitvector1. Aggregation unit 502 may generate two outputs for the result set: the name of the group and the result of the aggregation operation for the group. The output of a first group when processing Query 3 is shown in Table 16 below. Aggregation unit 502 stores this output (aggregate result 750) in output cache 120.

TABLE 16

| First output of aggregate unit | |
|---|---|
| GROUP | SUM |
| Pedro | 1070 |

Some aggregation operations may involve more than two outputs. For example, the AVG function may save GROUP, RUNNING AVERAGE, and TOTAL ELEMENTS in order to calculate the average for subsequent occurrences of the group.

Figure 7B:
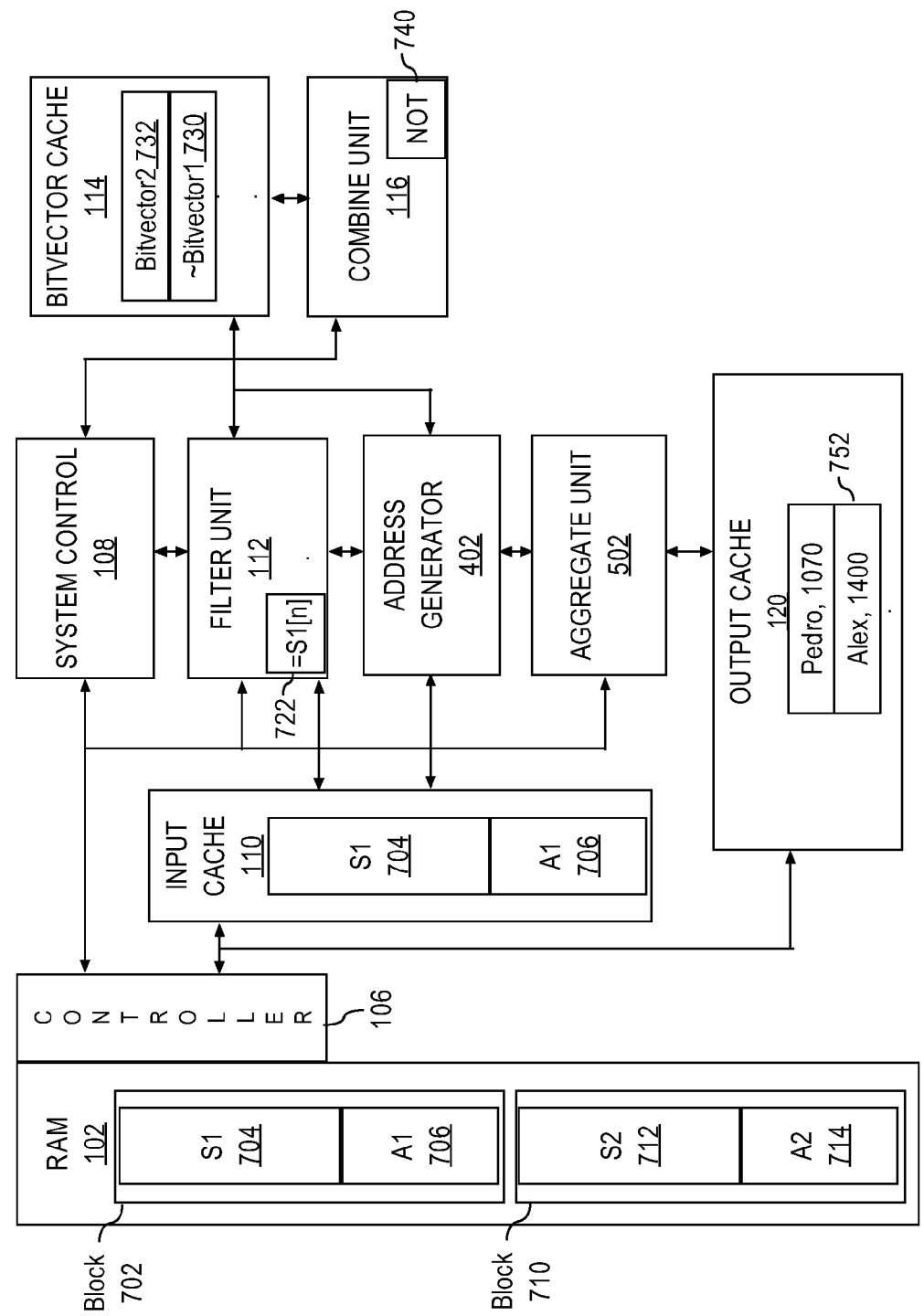

FIG. 7B is a system diagram after processing a second group. Concurrently with aggregation unit 502 operating on the first group-membership bitvector to generate aggregate results for the first group, filter unit 112 may begin producing the next group-membership bitvector for a second group. This time, filter unit 112 is only fed the rows that produced a "0" the first time they were passed through the filter unit. In an example embodiment, combine unit 116 performs bitwise NOT operation 740 on Bitvector1 to generate a bitvector mask ~Bitvector1 730 and stores this bitvector mask in bitvector cache 114. The bitvector mask ~Bitvector1 730 identifies all rows that have not yet been grouped.

Once generated, this bitvector mask may then be sent to address generator 402, which translates ~Bitvector1 730 into memory addresses for the rows that have not been previously grouped and causes only these rows to be delivered to filter unit 112. Filter unit 112 may then operate on these ungrouped rows by taking the first element from the previously ungrouped rows provided by address generator 402 and using equivalence to this first element as the new predicate 722. In the present example, equivalence to the value "Alex" is used as the new predicate 722. Filter unit 112 evaluates the remaining rows that have not been previously grouped using predicate 722 to generate a group-membership bitvector for the second group, Bitvector2 732 and stores this group-membership bitvector in bitvector cache 114. Each bit in Bitvector2 732 with a bit value "1" corresponds to a row belonging to the second group. Aggregation unit 502 uses Bitvector2 to generate the aggregate result 752, which sums the AMOUNT column for those rows in the second group. Result 752 is stored in output cache 120.

Figure 7C:
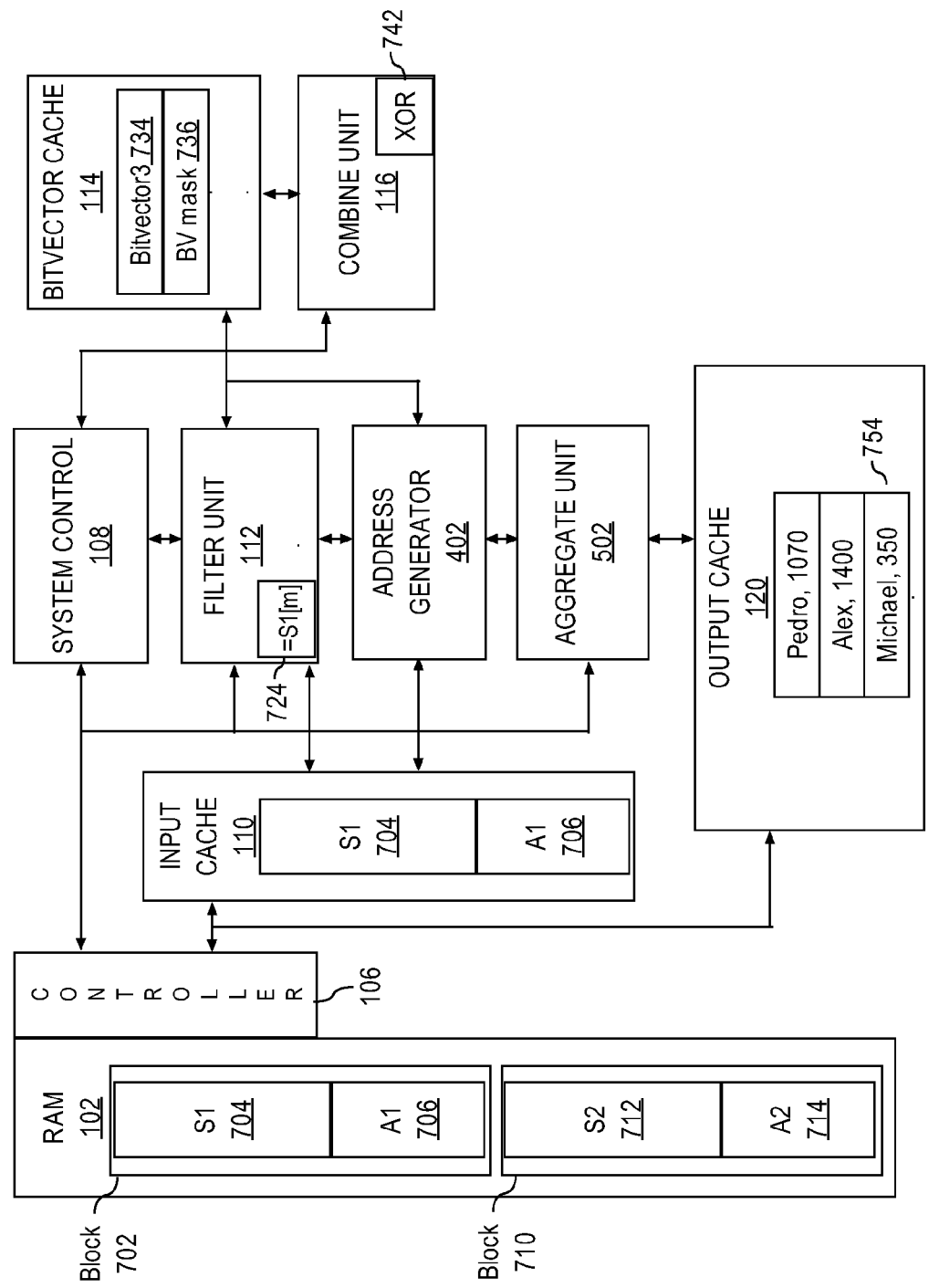

FIG. 7C is a system diagram after processing a third group. Processing the third group may proceed in a similar fashion to processing the second group, except that a different bitvector mask is used to indicate which rows should be sent to filter unit 112. To determine which rows should be provided to filter unit 112, combine unit 116 may perform an exclusive or (XOR 742) bitwise operation with Bitvector2 and the previous bitvector mask ~Bitvector1 to generate the new bitvector mask BV mask 736. Each bit of BV mask 736 with a bit value of "1" corresponds to a row that has not yet been grouped. Address generator 402 uses BV mask 736 to provide filter unit 112 with rows that have not yet been grouped. Filter unit 112 uses equivalence to the value "Michael" as the new predicate 724 to generate Bivector3 734. Aggregation unit 502 uses Bitvector3 734 to generate the aggregate result 754, which sums the AMOUNT column for those rows in the third group. Result 754 is stored in output cache 120. Table 17 below shows the group-membership bitvectors generated in these steps. If there are additional groups in a block, their processing would be analogous to that of the third group.

TABLE 17

Bitvectors produced through the third pass of the filter unit

| SALESMAN | Bitvector1 | Bitvector2 | Bitvector3 |
|---|---|---|---|
| Pedro | 1 | 0 | 0 |
| Pedro | 1 | 0 | 0 |
| Alex | 0 | 1 | 0 |
| Michael | 0 | 0 | 1 |
| Alex | 0 | 1 | 0 |
| Alex | 0 | 1 | 0 |
| Pedro | 1 | 0 | 0 |

At the end of aggregation of data in the first block, the table stored in output cache 120 may be represented by the table shown in Table 18 below.

TABLE 18

Aggregate output after a single block

| GROUP | SUM |
|---|---|
| Pedro | 1070 |
| Alex | 1400 |
| Michael | 350 |

Figure 7D:
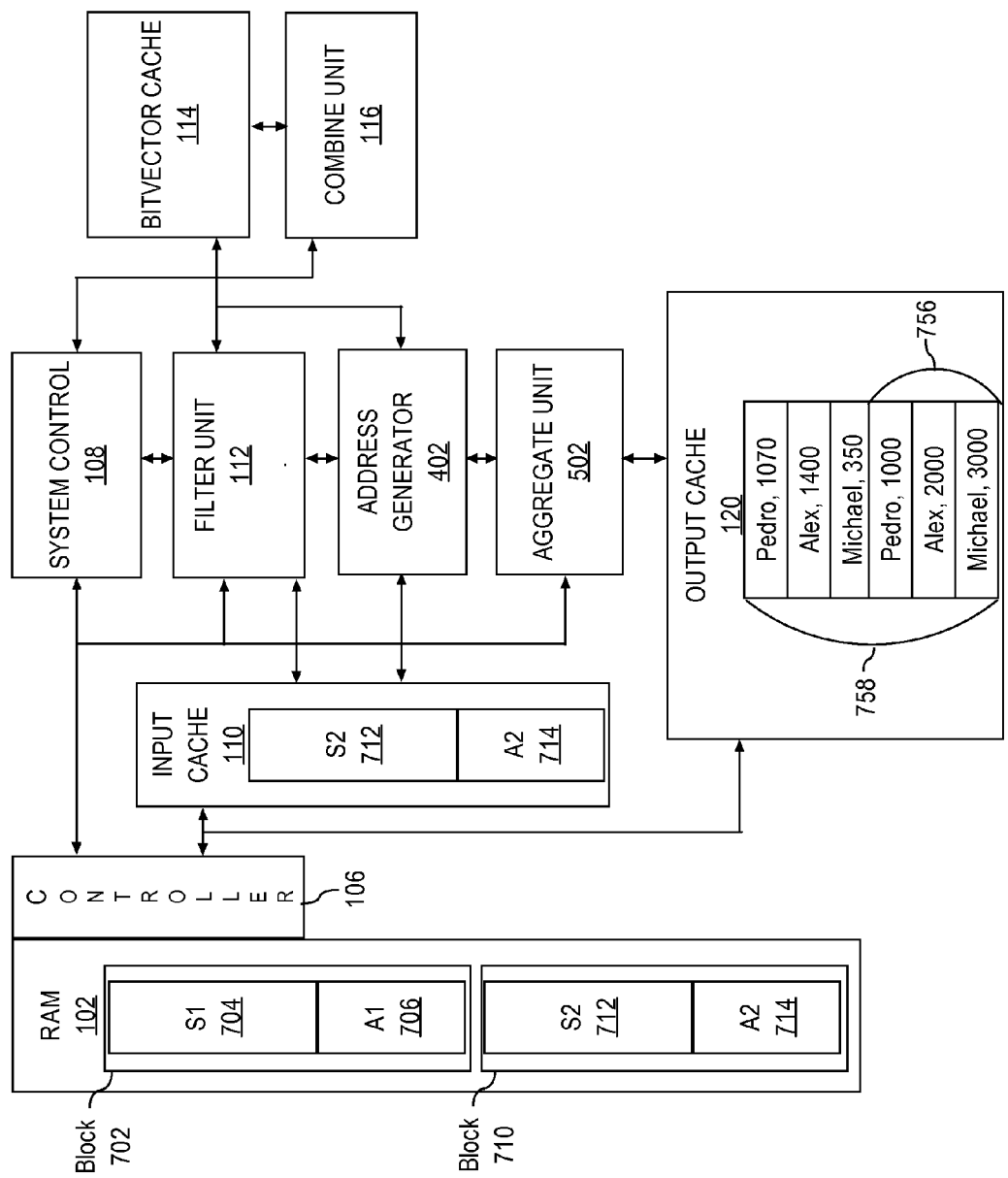

FIG. 7D is a system diagram after two blocks in RAM have been processed. In particular, the same processes that were applied to block 702 may be applied to block 710 to group and aggregate data stored in the second block. Block 710 stores a second portion of the SALESMAN column, S2 712, and a second portion of the AMOUNT column, A2 714. For purposes of simplicity, it is assumed that, in block 710, the sales for Pedro, Alex, and Michael sum to 1000, 2000, and 3000, respectively. Thus, the grouping and aggregation operations generate result set 756, which is stored in output cache 120 along with the result set generated when processing the first block. Thus, output cache 120 stores combined result set 758. Table 19 below shows a representation of the output after two blocks have been processed.

TABLE 19

Aggregate output after two blocks

| GROUP | SUM |
|---|---|
| Pedro | 1070 |
| Alex | 1400 |
| Michael | 350 |
| Pedro | 1000 |
| Alex | 2000 |
| Michael | 3000 |

Figure 7E:
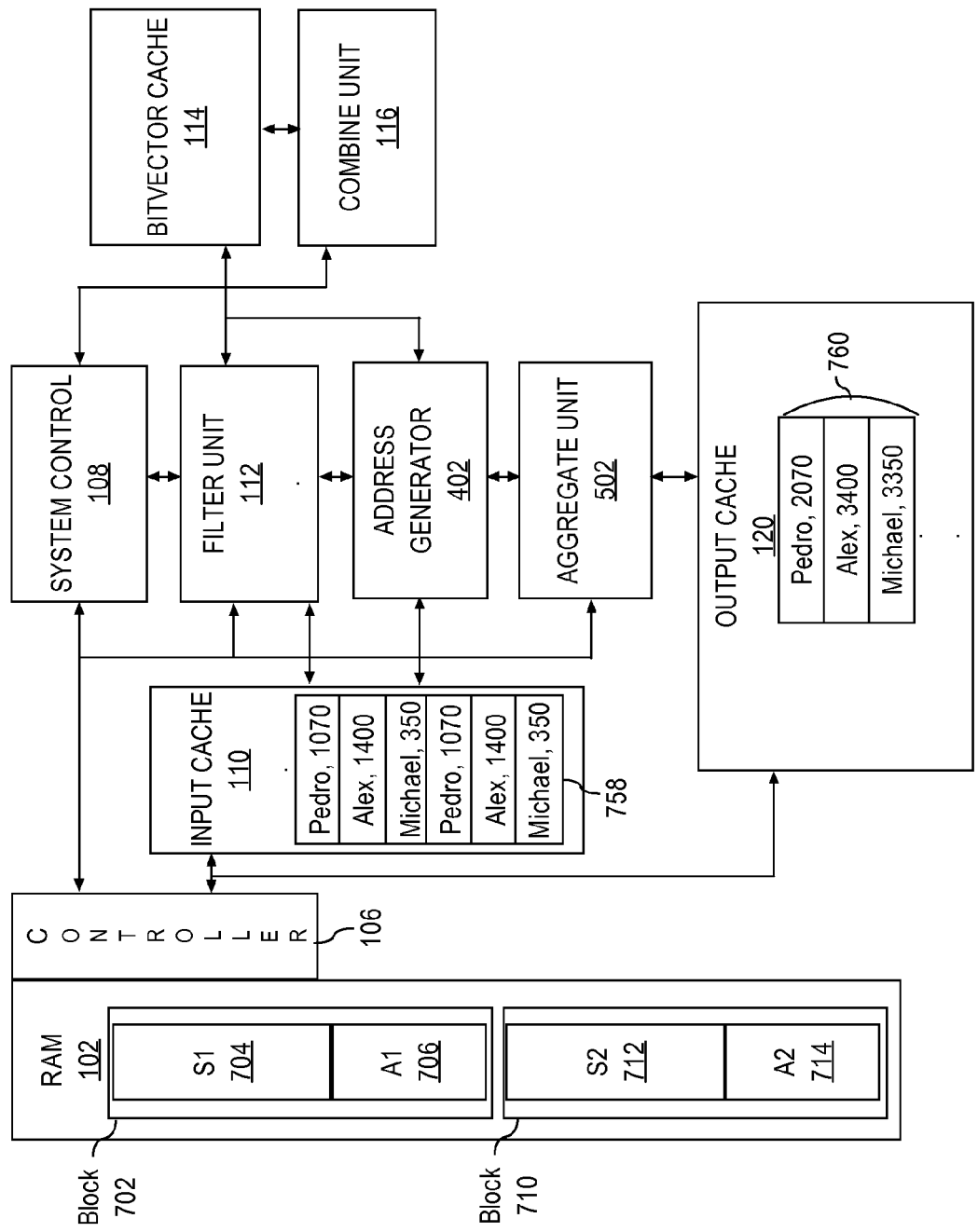

FIG. 7E is a system diagram after results in the output cache has been processed. If available storage in output cache 120 is less than a threshold or a final aggregate result for each of the blocks is ready to be computed, result set 758 may be sent to input cache 110 for further processing and consolidation. A grouping and aggregation operation is then run on the input cache data in the same fashion as described previously. After this aggregate pass, the data that ends up in the result cache is shown in Table 20 below. This data is stored as result 760 in output cache 120.

TABLE 20

Result cache data after aggregate on a full result cache

| GROUP | SUM |
|---|---|
| Pedro | 2070 |
| Alex | 3400 |
| Michael | 3350 |

Thus, the separate result sets generated for each block are grouped and aggregated to generate a single result set for both blocks.

If there are additional RAM blocks remaining, this process continues until all blocks are aggregated. If the result cache completely fills or reaches a state of such high occupancy that performance seriously degrades, then the result cache contents may be passed to another unit such as a general purpose processor for larger-scale aggregation.

Cache Sizing

The sizes of input cache 110, bitvector cache 114, and output cache 120 may vary depending on the particular implementation. Small caches have several benefits, including faster operation and smaller area consumption. However, larger cache sizing may reduce the number of RAM accesses during the filter and project operations. Therefore, the optimal cache size of the various caches may vary depending on the implementation.

In one embodiment, the size of input cache 110, bitvector cache 114 and/or output cache 120 is selected to approximate the size of one or more blocks of RAM, such as blocks 104A to 104N. With cache sizes that approximate block sizes, the system may efficiently perform filter and project operations on a block-by-block or multi-block basis with limited RAM accesses.

In another embodiment, the caches are sized such that the input cache has sufficient storage for the column being grouped as well as the column storing the aggregate data. Both of these columns may be processed multiple times if the group cardinality is greater than one in a block, so having a cache large enough to store both columns may save the time and power of reading them from RAM repeatedly.

In another embodiment, the output cache may be sized depending on the expected cardinality of the overall dataset as well as the cardinality within blocks. The higher the cardinality of the number of groups within a block, the quicker the output cache will fill causing the result data to be aggregated more often during the grouping and aggregation operations described above. Likewise, if the overall cardinality of the group data is high, the output cache may not be able to hold the results for every group no matter how many extra aggregates are performed. If the output cache is full even after an aggregate has been run on its contents, a higher-level processing node may be used to complete the aggregate, which may cause degradation in performance. Therefore, an output cache that is large enough to hold at least the final result set may improve performance.

The size of the caches may also be selected based on the relative speeds of the memory interface for RAM 102 and database units such as filter unit 112, combine unit 116, and project unit 118. If the memory is fast compared to the database units, then a smaller cache may be preferable because the cost associated with frequent loads may be small. Conversely, if the memory is slow compared to the processing speed of the database units, then a larger cache size may be more efficient.

In another embodiment, the size of input cache 110, bitvector cache 114 and/or output cache 120 is selected based on the nature of the database workload. In some instances, column data within a block may be processed by the database units multiple times such as when many predicates are applied to the same column. If such a scenario is common in a particular implementation, then larger cache sizes may improve performance by allowing column data to reside in the caches for a greater period of time.

Multi-Column Grouping

The above grouping and aggregation example describes processing Query 3 from Table 6, but the same system may process Query 4, which groups data based on multiple columns instead of a single column. In one embodiment, the columns involved in the GROUP BY may be combined together. For example, in the case of Query4, the SALESMAN and CUSTOMER columns may be combined, such as by concatenation. The combined column may then be sent to filter unit 112 in step 602. The two columns would then be separated at some point, such as before being written into the output cache. System 500 may include an additional database unit for combining the columns before they are sent to filter unit 112 and an additional database unit for separating the columns before the output cache 120.

In another embodiment, a filter unit that is capable of operating on multiple columns, such as described above, is used to process multi-column groupings. For example, a filter unit with multiple column inputs would be able to implement and evaluate a predicate such as SALESMAN=first element of SALESMAN column AND CUSTOMER=first element of CUSTOMER column in a single pass. For query3, a filter unit capable of handling a two-column input would be sufficient. If the GROUP BY groups data by more than two columns, the filter unit may be configured to accept more columns or the system may iterate through the combinations of columns.

Multiple Groups Per Pass

In an embodiment, filter unit 112 may be configured to process multiple streams such that multiple groups may be determined in a single pass. For example, as the CUSTOMER column is processed by filter unit 112, one stream may apply the predicate SALESMAN=first element of SALESMAN, while another stream waits for the first case of SALESMAN!=first element of SALESMAN and uses that SALESMAN value as the equivalence predicate. This approach is similar to the techniques for performing multi-column grouping described in the preceding section, but the same column is sent to all streams and the predicates are based on the results of previous predicates.

According to this process, filter unit 112 generates a group-membership bitvector for each group that it processes. If the filter unit is capable of producing N groups per pass, where N represents a positive integer value, then bitvector cache 114 may be configured to store N+2 group-membership bitvectors: N bitvectors that are the output of filter unit 112, one bitvector that ORs the N bitvectors together, and the bitvector mask that operates on the ORed bitvectors as described in the example implementation above.

In alternative embodiments, bitvector cache 114 may be configured to store N or N+1 bitvectors, depending on the implementation. For example, some of the N bitvectors can be overwritten by the OR combination or the bitvector mask.

When aggregating data, aggregation unit 502 may operate on the N bitvectors sequentially. Alternatively, if aggregation unit 502 is also configured to process multiple streams, aggregation unit 502 may operate on these bitvectors simultaneously.

Additional Parallelism

The techniques described above illustrate a sequential processing of the steps presented. However, some of these steps may be performed in parallel, depending on the implementation. For example, combine unit 116 could process bitvectors as the bits became available from filter unit 112 rather than waiting for filter unit 112 to complete the predicate evaluation. As another example, while project unit 118 is processing a column for output cache 120, filter unit 112 may begin processing the next column to be filtered. Other steps such as cache loading and access could be performed in parallel with other filtering and projection steps as well. In yet another example, while aggregation unit 502 is processing a column for output cache 120, filter unit 112 may start processing the next group. Other operations such as cache loading and access could also operate in parallel.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
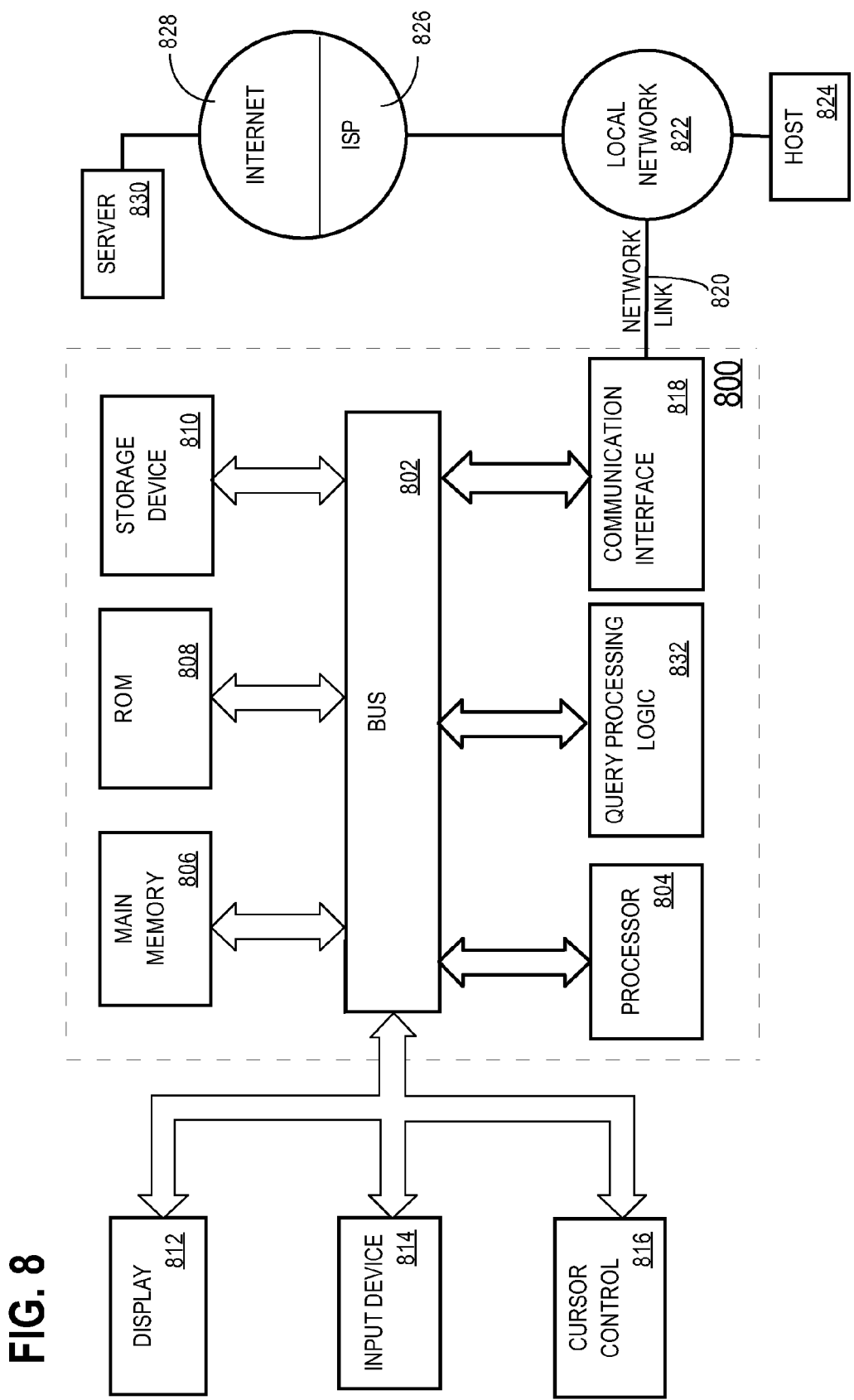
FIG. 8 is a block diagram of a computer system upon which embodiments may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. For example, RAM 102 may be implemented in main memory 806. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may also include query processing logic 832 for performing filter, project, grouping, and/or aggregation operations. Query processing logic 832 may be implemented using one or more elements illustrated in system 100, system 400, or system 500.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving a request to aggregate data grouped by a first column;
in response to receiving the request, performing the steps of:
parsing the request to identify one or more predicates associated with the request;
determining how the one or more predicates should be programmed into reconfigurable hardware;
programming the reconfigurable hardware to produce a predicate-specific circuit that implements a filter unit into which the one or more predicates are programmed; and
loading values from the first column into an input cache;
wherein the values loaded into the input cache include values, from the first column, from a set of rows;
wherein the predicate-specific circuit includes logic to perform a comparison between a particular value, from the first column of a first row, and
values in the first column of a plurality of rows, of the set of rows;
based on the comparison of the particular value to values in the first column of the plurality of rows, generating a predicate result that identifies rows, within the plurality of rows, that have values in the first column that match the particular value; and
passing the predicate result produced by the predicate-specific circuit to an aggregation unit that includes logic to generate an aggregate value for a second column by aggregating values, from the second column, of each of the rows identified by the predicate result;
wherein the method is performed by one or more computing devices.

2. The method of claim 1,
wherein the predicate result is a bitvector and each bit of the bitvector corresponds to a corresponding row of the set of rows;
wherein generating the predicate result comprises:
setting a bit of the bitvector to a first bit value when values of the corresponding row match the particular value;
setting a bit of the bitvector to a second bit value when the values of the corresponding row does not match the particular value.

3. The method of claim 2, further:
wherein the bitvector is a first bitvector in a set of bitvectors; and
wherein the method further comprises:
selecting a second row, from the set of rows, for which the corresponding bit has not been set to the first bit value in any bitvector of the set of bitvectors;
programming a comparison circuit into the reconfigurable hardware of the filtering unit;
wherein the comparison circuit has logic to perform a comparison between a second value, from the first column of the second row, and
values in the first column of a second plurality of rows, of the set of rows;
based on the comparison of the second value to values in the first column of the second plurality of rows, generating a second bitvector that identifies rows, within the second plurality of rows, that have values in the first column that match the second value; and
generating a second aggregate value for the second column by aggregating values, from the second column, of each of the rows identified by the second bitvector.

4. The method of claim 3, wherein the second plurality of rows are rows for which corresponding bits have not been set to the first bit value in any bitvector of the set of bitvectors.

5. The method of claim 3, wherein determining whether the corresponding bit has not been set to the first bit value in any bitvector of the set of bitvectors comprises performing at least one of a bitwise NOT operation or a bitwise XOR operation on one or more bitvectors in the set of bitvectors to generate a bitvector mask identifying rows for which the corresponding bit has not been set to the first bit value.

6. The method of claim 1, further comprising:
programming the aggregation unit to perform an aggregation operation specified in the request;
wherein aggregating values of the second column for each of the rows identified by the predicate result comprises:
causing the aggregation unit to apply the aggregation operations to values of the second column.

7. The method of claim 1 further comprising outputting results that include:
a group name identified by the particular value; and
the aggregate value generated by aggregating the values of the second column for each of the rows identified by the predicate result.

8. The method of claim 1, further comprising:
translating the predicate result into a set of memory addresses;
wherein each memory address in the set of memory addresses identifies a memory location of a row that is part of a first group.

9. A non-transitory computer-readable medium storing instructions, which, when executed by one or more processors, cause one or more computing devices to perform operations comprising:
receiving a request to aggregate data grouped by a first column;
in response to receiving the request:
parsing the request to identify one or more predicates associated with the request;
determining how the one or more predicates should be programmed into reconfigurable hardware;
programming the reconfigurable hardware to produce a predicate-specific circuit that implements a filter unit into which the one or more predicates are programmed; and
loading values from the first column into an input cache;
wherein the values loaded into the input cache include values, from the first column, from a set of rows;
wherein the predicate-specific circuit includes logic to perform a comparison between a particular value, from the first column of a first row, and values in the first column of a plurality of rows, of the set of rows;

based on the comparison of the particular value to values in the first column of the plurality of rows, generating a predicate result that identifies rows, within the plurality of rows, that have values in the first column that match the particular value; and passing the predicate result produced by the predicate-specific circuit to an aggregation unit that includes logic to generate an aggregate value for a second column by aggregating values, from the second column, of each of the rows identified by the predicate result.

10. The non-transitory computer-readable medium of claim 9, wherein the predicate result is a bitvector and each bit of the bitvector corresponds to a corresponding row of the set of rows;

wherein instructions for generating the predicate result comprise instructions for:

setting a bit of the bitvector to a first bit value when values of the corresponding row match the particular value;

setting a bit of the bitvector to a second bit value when the values of the corresponding row does not match the particular value.

11. The non-transitory computer-readable medium of claim 10, wherein the bitvector is a first bitvector of a set of bitvectors; and wherein the instructions further cause one or more computing devices to perform operations comprising:

selecting a second row, from the set of rows, for which the corresponding bit has not been set to the first bit value in any bitvector of the set of bitvectors;

programming a comparison circuit into the reconfigurable hardware of the filtering unit with logic to perform a comparison between a second value, from the first column of the second row, and values in the first column of a second plurality of rows, of the set of rows;

based on the comparison of the second value to values in the first column of the second plurality of rows, generating a second bitvector that identifies rows, within the second plurality of rows, that have values in the first column that match the second value; and generating a second aggregate value for the second column by aggregating values, from the second column, of each of the rows identified by the second bitvector.

12. The non-transitory computer-readable medium of claim 11, wherein the second plurality of rows are rows for which corresponding bits have not been set to the first bit value in any bitvector of the set of bitvectors.

13. The non-transitory computer-readable medium of claim 11, wherein instructions for determining whether the corresponding bit has not been set to the first bit value in any bitvector of the set of bitvectors comprise instructions for performing at least one of a bitwise NOT operation or a bitwise XOR operation on one or more bitvectors in the set of bitvectors to generate a bitvector mask identifying rows for which the corresponding bit has not been set to the first bit value.

14. The non-transitory computer-readable medium of claim 9, further storing instructions which cause the one or more computing devices to perform operations comprising:

programming the aggregation unit to perform an aggregation operation specified in the request;

wherein instructions for aggregating values of the second column for each of the rows identified by the predicate result comprise instructions for:

causing the aggregation unit to apply the aggregation operations to values of the second column.

15. The non-transitory computer-readable medium of claim 9, further storing instructions for outputting results that include:

a group name identified by the particular value; and the aggregate value generated by aggregating the values of the second column for each of the rows identified by the predicate result.

16. The non-transitory computer-readable medium of claim 9, further storing instructions which cause the one or more computing devices to perform operations comprising:

translating the predicate result into a set of memory addresses;

wherein each memory address in the set of memory addresses identifies a memory location of a row that is part of a first group.

17. A system for performing grouping and aggregation operations comprising:

a control unit configured to:

receive a request to aggregate data grouped by a first column;

parse the request to identify one or more predicates associated with the request;

determine how the one or more predicates should be programmed into reconfigurable hardware;

cause values to be loaded from the first column into an input cache;

wherein the values loaded into the input cache include values, from the first column, from a set of rows;

a filter unit that is coupled to the control unit and comprises first reconfigurable hardware, wherein the first reconfigurable hardware, when programmed based on the request by the control unit to produce a predicate-specific circuit that implements the filter unit into which the one or more predicates are programmed, is configured to:

compare a particular value, from the first column of a first row, and values in the first column of a plurality of other rows, of the set of rows;

based on said comparing, generating a bitvector that identifies rows, within the plurality of rows, that have values in the first column that match the particular value;

an aggregate unit that is coupled to the control unit is configured to:

receive the bitvector produced by the filter unit;

generate an aggregate value for a second column by aggregating values, from the second column, of each of the rows identified by the bitvector.

18. The system of claim 17, wherein each bit of the bitvector generated by the filter unit corresponds to a corresponding row of the set of rows;

wherein to generate the bitvector, the filter unit is configured to:

set a bit of the bitvector to a first bit value when values of the corresponding row match the particular value;

set a bit of the bitvector to a second bit value when the values of the corresponding row does not match the particular value.

19. The system of claim 17, further comprising an address generator unit configured to:
    translate the bitvector into a set of memory addresses;
    wherein each memory address in the set of memory addresses identifies a memory location of a row that is part of a first group.

\* \* \* \* \*

UNITED STATES PATENT AND TRADEMARK OFFICE
CERTIFICATE OF CORRECTION

PATENT NO. : 9,600,522 B2  
APPLICATION NO. : 13/590110  
DATED : March 21, 2017  
INVENTOR(S) : Schauer et al.

Page 1 of 1

It is certified that error appears in the above-identified patent and that said Letters Patent is hereby corrected as shown below:

On the Title Page

Column 2, under Attorney, Line 1, delete "Palmero" and insert -- Palermo --, therefor.

On page 2, Column 2, under Other Publications, Line 22, delete "Aciton," and insert -- Action, --, therefor.

In the Specification

In Column 11, Line 28, delete "SALEMAN" and insert -- SALESMAN --, therefor.

In Column 13, Line 56, after "402" insert -- . --.

In Column 15, Line 66, delete "SALEMAN" and insert -- SALESMAN --, therefor.

In Column 19, Line 25, delete "Bivector3" and insert -- Bitvector3 --, therefor.

Signed and Sealed this  
Twenty-second Day of August, 2017

Joseph Matal  
*Performing the Functions and Duties of the*  
*Under Secretary of Commerce for Intellectual Property and*  
*Director of the United States Patent and Trademark Office*